United States Patent [19]

Emoto et al.

[11] Patent Number: 4,600,674
[45] Date of Patent: Jul. 15, 1986

[54] TRISAZO ELECTROPHOTOGRAPHIC PHOTOCONDUCTIVE MATERIAL

[75] Inventors: Kazuhiro Emoto; Akira Itoh, both of Nagaokakyo, Japan

[73] Assignee: Mitsubishi Paper Mills, Ltd., Tokyo, Japan

[21] Appl. No.: 748,398

[22] Filed: Jun. 24, 1985

[30] Foreign Application Priority Data

Jun. 21, 1984 [JP] Japan .................................. 59-132206
Jul. 10, 1984 [JP] Japan .................................. 59-143736

[51] Int. Cl.⁴ .............................................. G03G 5/06
[52] U.S. Cl. ..................................... 430/72; 430/58;
430/59; 430/76; 430/77; 430/78; 430/79;
534/740; 534/741; 534/743; 534/755; 534/810;
534/811; 534/812; 534/815
[58] Field of Search ...................... 430/58, 59, 72, 76,
430/77, 78, 79; 534/740, 741, 743, 755, 810,
811, 812, 815

[56] References Cited

U.S. PATENT DOCUMENTS

| | | | |
|---|---|---|---|
| 4,279,981 | 7/1981 | Ohta et al. | 430/58 X |
| 4,390,611 | 6/1983 | Ishikawa et al. | 430/77 X |
| 4,426,432 | 1/1984 | Sawada et al. | 430/58 |
| 4,433,039 | 2/1984 | Miyakawa et al. | 430/58 |
| 4,507,471 | 3/1985 | Ohta | 430/79 X |
| 4,562,131 | 12/1985 | Sasaki et al. | 430/76 X |

Primary Examiner—Roland E. Martin
Attorney, Agent, or Firm—Cushman, Darby & Cushman

[57] ABSTRACT

Disclosed is an electrophotographic photoconductive material excellent in sensitivity and durability which comprises an electroconductive substrate and, provided thereon, a photosensitive layer containing a trisazo pigment represented by the general formula

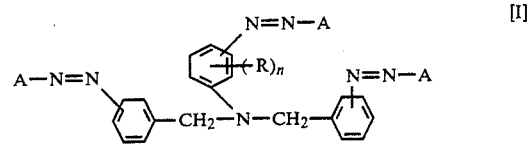

wherein R's, which may be the same or different, represent each a hydrogen atom, halogen atom, substituted or unsubstituted alkyl group, alkoxyl group, or nitrile group; n is an integer of 1 or 2; and A represents

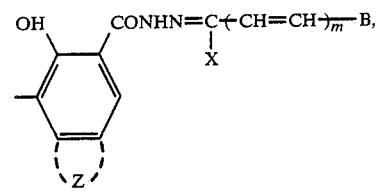

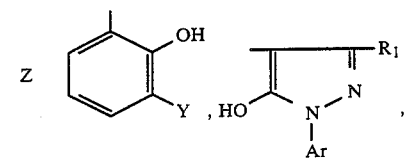

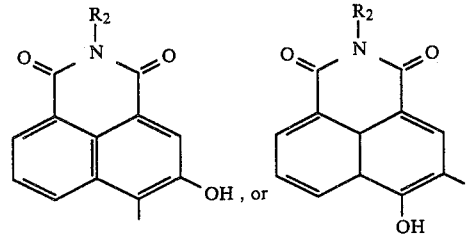

wherein Z represents a group of atoms necessary to complete a substituted or unsubstituted aromatic carbon ring or a substituted or unsubstituted aromatic hetero-ring; X represents a hydrogen atom, an alkyl group, or a group of atoms necessary to complete a substituted or unsubstituted aromatic carbon ring, a substituted or unsubstituted aromatic hetero ring, or a substituted or (Abstract continued on next page.)

unsubstituted hetero ring; m is 0 or 1; B represents a group of atoms necessary to complete a substituted or unsubstituted aromatic carbon ring, a substituted or unsubstituted aromatic hetero ring, or a substituted or unsubstituted monocyclic hetero ring; Y represents a hydrogen atom, hydroxyl group, carboxyl group or an ester thereof, sulfo group, substituted or unsubstituted carbamoyl group, or substituted or unsubstituted sulfamoyl group; $R_1$ represents a hydrogen atom, substituted or unsubstituted alkyl group, substituted or unsubstituted amino group, substituted or unsubstituted carbamoyl group, carboxyl group or an ester thereof, or cyano group; Ar represents a substituted or unsubstituted aryl group; and $R_2$ represents a substituted or unsubstituted alkyl group, substituted or unsubstituted aralkyl group, or substituted or unsubstituted aryl group.

3 Claims, 4 Drawing Figures

TRISAZO ELECTROPHOTOGRAPHIC PHOTOCONDUCTIVE MATERIAL

BACKGROUND OF THE INVENTION

This invention relates to an electrophotographic photoconductive material and, particularly, to a novel electrophotographic photoconductive material having a photosensitive layer containing an azo pigment. More particularly, it relates to a highly durable electrophotographic photoconductive material excellent in sensitivity and suitable for repeated use.

There have, heretofore, been widely known electrophotographic photoconductive materials having photosensitive layers containing as major constituent inorganic photoconductive substances such as selenium, zinc oxide, cadmium sulfide, and the like. These photoconductive materials, however, are not entirely satisfactory in sensitivity, thermal stability, moisture resistance, and durability. Especially, the toxicity of selenium and cadmium sulfide imposes some restriction on their manufacture and handling.

In recent years, electrophotographic photoconductive materials having a photosensitive layer containing as major constituent an organic photoconductive compound have attracted much attention because of the ease of their manufacture and other advantages including thermal stability which is generally superior to that of the selenium photoconductor. A well-known organic photoconductive compound is poly-N-vinylcarbazole. However, a photoconductive material having a photosensitive layer containing as major constituent a charge transfer complex formed from poly-N-vinylcarbazole and 2,4,7-trinitro-9-fluorenone is not entirely satisfactory in sensitivity and durability.

There are also known photoconductive materials of the functionally separated type such as a laminated type and a dispersion type, in which the carrier generating function and the carrier transfer function are respectively borne by different substances. Such a type of photoconductive material has advantages in that the materials can be selected from a wide range to facilitate the preparation of photoconductive materials having any of the intended characteristics such as charge characteristics, sensitivity, durability, and the like.

Various substances have been proposed to be useful for the generation or transfer of the carrier. For instance, there is actually in use an electrophotographic photoconductive material having a photosensitive layer comprising a combination of a carrier generating layer containing amorphous selenium and a carrier transfer layer containing poly-N-vinylcarbazole as major constituent. The carrier generating layer comprising amorphous selenium, however, has a drawback of unsatisfactory durability.

It has also been proposed to use organic dyes or pigments as carrier generating substance. For instance, photoconductive materials having photosensitive layers containing, for example, monoazo or bisazo pigments are described in Japanese Patent Publication No. 30,513/73, Japanese Patent Application "Kokai" (Laid-open) Nos. 4,241/77 and 46,558/79, and Japanese Patent Publication No. 11,945/81. These azo pigments, however, are not entirely satisfactory in photo characteristics such as sensitivity, residual potential, or stability in repeated use. When such a pigment is used as carrier generating substance, the carrier transfer substance should be selected from a limited range. Thus, the fact is that there is no carrier generating substance which satisfactorily meets a wide variety of requirements of the electrophotographic process.

SUMMARY OF THE INVENTION

An object of this invention is to provide an electrophotographic photoconductive material comprising an azo pigment which is stable against heat and light and is excellent in carrier generating ability.

Another object of this invention is to provide an electrophotographic photoconductive material characterized by high sensitivity, low residual potential, and high durability, the characteristics being unaffected by repeated use.

Still another object of this invention is to provide an electrophotographic photoconductive material containing an azo pigment capable of effectively functioning as carrier generating substance even when used in combination with a wide variety of carrier transfer substances.

DESCRIPTION OF THE INVENTION

Figure 1:
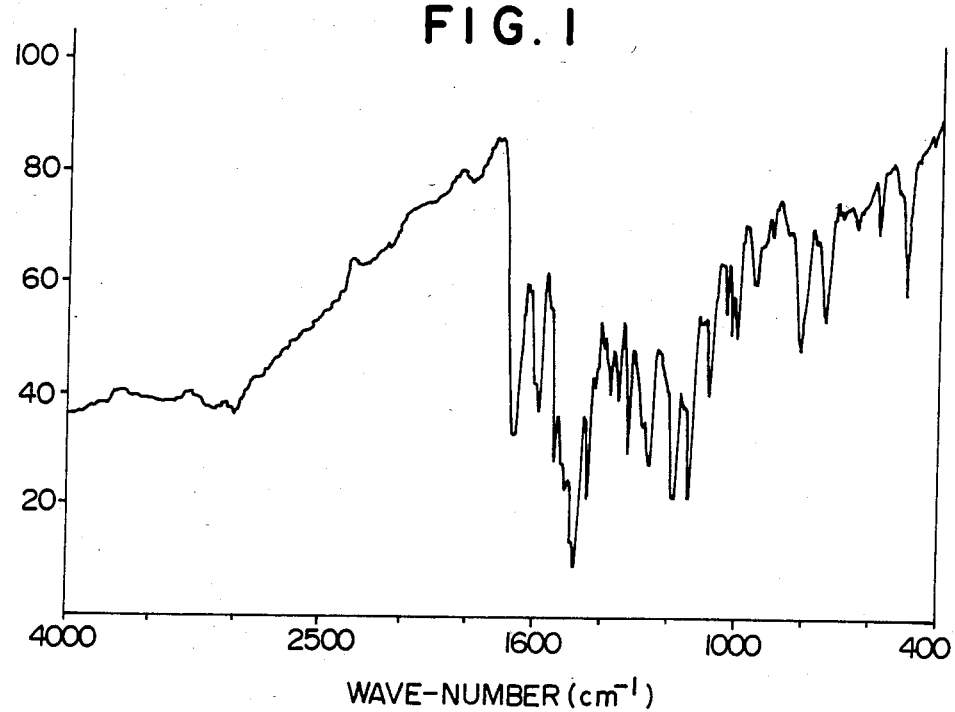
FIG. 1 is the IR absorption spectrum of No. I-2 pigment exemplified hereinafter.

The present inventors carried out an extensive study to achieve the aforementioned objects and, as a result, found that the azo pigments represented by the following general formula [I] are capable of serving as effective constituent of the photoconductive material. Based on this discovery, the present invention has been accomplished.

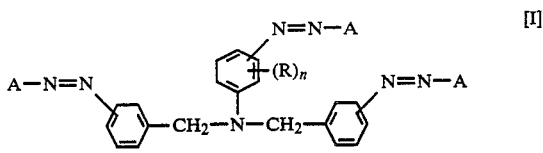

wherein R's, which may be the same or different, represent each a hydrogen atom, halogen atom, alkyl group, alkoxyl group, or nitrile group; n is an integer of 1 or 2; and A represents

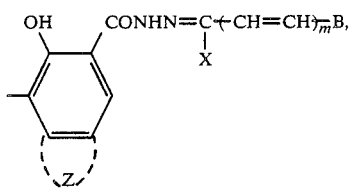

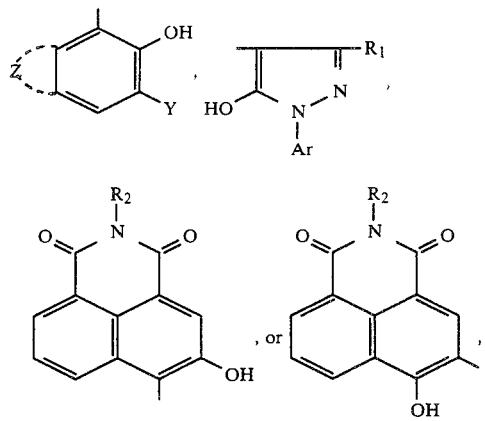

wherein Z represents a group of atoms necessary to complete a substituted or unsubstituted aromatic carbon ring or a substituted or unsubstituted aromatic hetero-ring; X represents a hydrogen atom, an alkyl group, or a group of atoms necessary to complete a substituted or unsubstituted aromatic carbon ring, a substituted or unsubstituted aromatic hetero-ring, or a substituted or unsubstituted hetero ring; m is 0 or 1; B represents a group of atoms necessary to complete a substituted or unsubstituted aromatic carbon ring, a substituted or unsubstituted aromatic hetero-ring, or a substituted or unsubstituted monocyclic hetero-ring; Y represents a hydrogen atom, hydroxyl group, carboxyl group or an ester thereof, sulfo group, substituted or unsubstituted carbamoyl group, or substituted or unsubstituted sulfamoyl group; $R_1$ represents a hydrogen atom, substituted or unsubstituted alkyl group, substituted or unsubstituted amino group, substituted or unsubstituted carbamoyl group, carboxyl group or an ester thereof, or cyano group; Ar represents a substituted or unsubstituted aryl group; and $R_2$ represents a substituted or unsubstituted alkyl group, substituted or unsubstituted aralkyl group, or substituted or unsubstituted aryl group.

According to this invention, the trisazo pigments represented by the general formula [I] are used as a photoconductive substance in the photosensitive layer of an electrophotographic photoconductive material or as a carrier generating substance in a photoconductive material of the functionally separated type, in which the carrier generation and the carrier transfer are performed by different substances. There is thus obtained an electrophotographic photoconductive material which is excellent in film properties and electrophotographic characteristics such as charge retention, sensitivity, and residual potential, is susceptible to little degradation due to fatigue after repeated use, and is resistant to heat and light without exhibiting any significant change in said characteristics.

As examples of particular trisazo pigments useful in this invention, there may be mentioned compounds of the following structures, but the invention is not limited thereto.

EXAMPLES OF COMPOUNDS

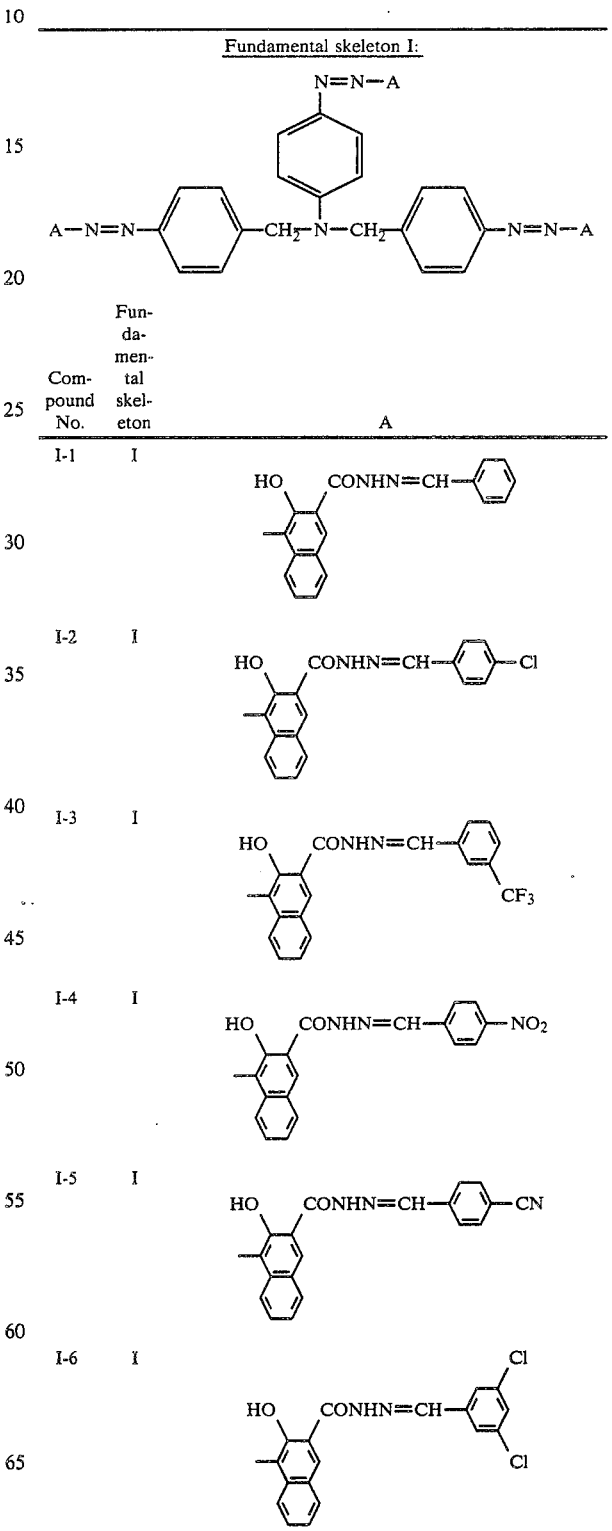

4,600,674

-continued

Fundamental skeleton I:

[Structure showing central phenyl with N=N-A at top, and two CH2-N linked phenyl-N=N-A groups]

| Compound No. | Fundamental skeleton | A |
|---|---|---|
| I-7 | I | 3-hydroxy-4-methyl-2-naphthoyl-NHN=CH—CH=CH—phenyl |
| I-8 | I | 3-hydroxy-4-methyl-2-naphthoyl-NHN=CH—CH=CH—(4-NO$_2$-phenyl) |
| I-9 | I | 3-hydroxy-4-methyl-2-naphthoyl-NHN=C(CH$_3$)—phenyl |
| I-10 | I | 3-hydroxy-4-methyl-2-naphthoyl-NHN=C(CH$_3$)—(3,4-dichlorophenyl) |
| I-11 | I | 3-hydroxy-4-methyl-2-naphthoyl-NHN=C(CH$_3$)—(4-CF$_3$-phenyl) |
| I-12 | I | 3-hydroxy-4-methyl-2-naphthoyl-NHN=C(C$_2$H$_5$)—phenyl |
| I-13 | I | 3-hydroxy-4-methyl-2-naphthoyl-NHN=C(nC$_3$H$_7$)—phenyl |
| I-14 | I | 3-hydroxy-anthracene-2-carbonyl-NHN=CH—phenyl |
| I-15 | I | 3-hydroxy-4-methyl-anthracene-carbonyl-NHN=CH—(3,4-dichlorophenyl) |
| I-16 | I | hydroxy-(carbazole-fused naphthalene)-carbonyl-NHN=CH—(3-NO$_2$-phenyl) |
| I-17 | I | hydroxy-(carbazole-fused naphthalene)-carbonyl-NHN=CH—CH=CH—phenyl |
| I-18 | I | hydroxy-(carbazole-fused naphthalene)-carbonyl-NHN=CH—(4-CF$_3$-phenyl) |

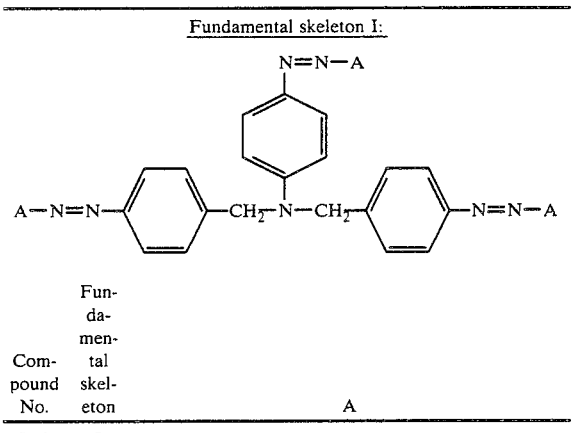

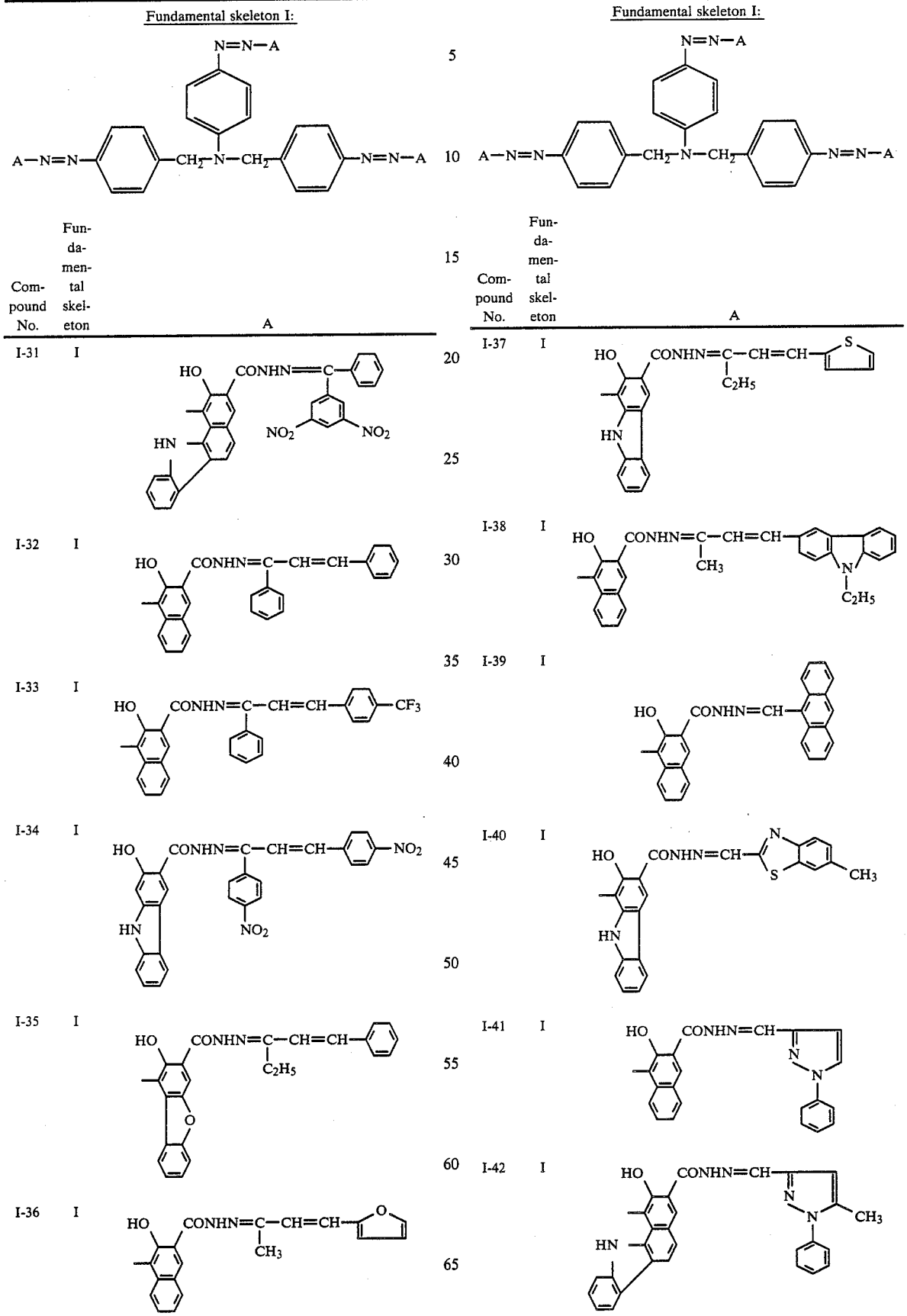

-continued
Fundamental skeleton I:
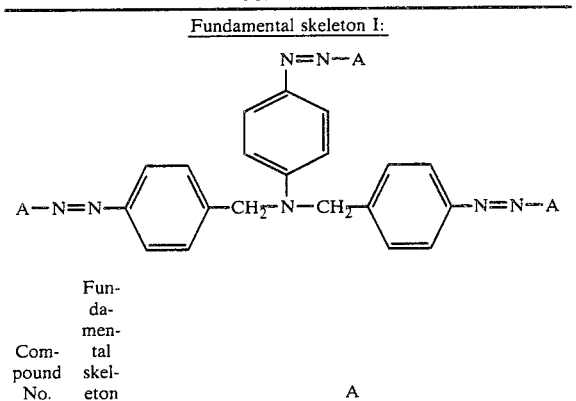
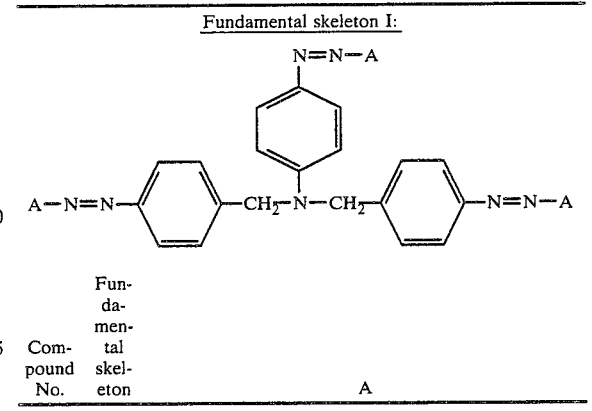
| Compound No. | Fundamental skeleton | A |
|---|---|---|
| I-43 | I | |
| I-44 | I | |
| I-45 | I | |
| I-46 | I | |
| I-47 | I | |
| I-48 | I | |
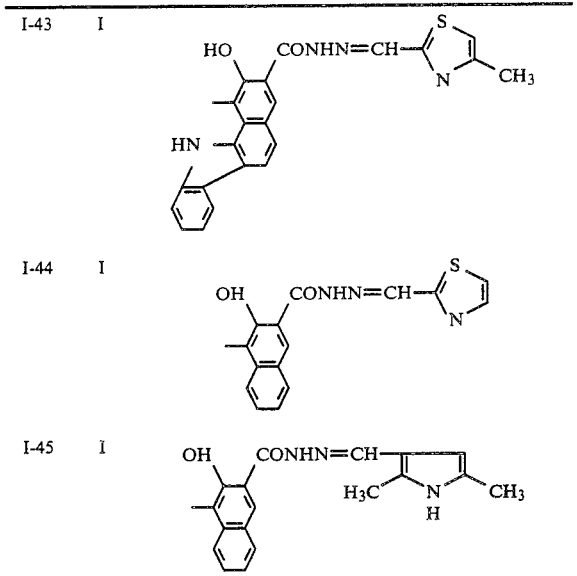
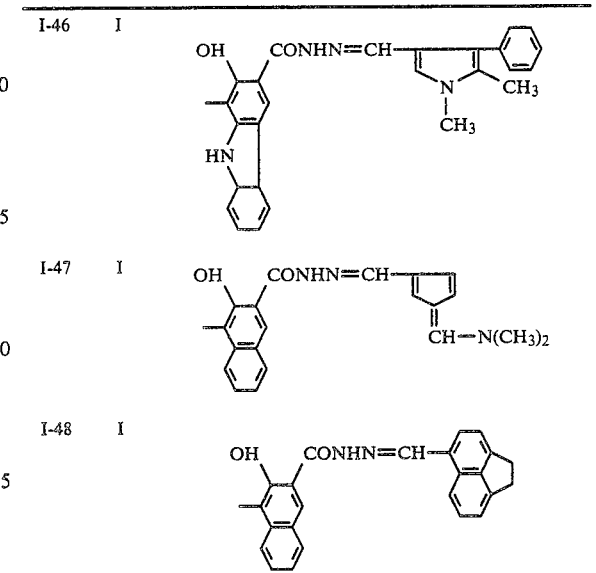
Fundamental skeleton II:
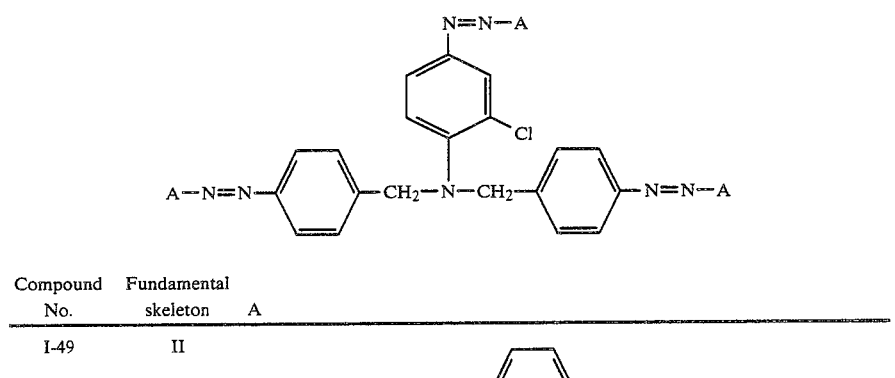
| Compound No. | Fundamental skeleton | A |
|---|---|---|
| I-49 | II | |
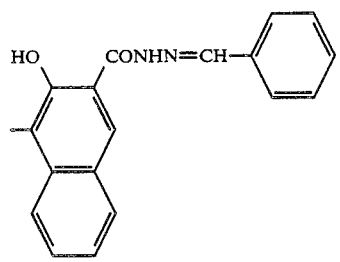

-continued
Fundamental skeleton II:
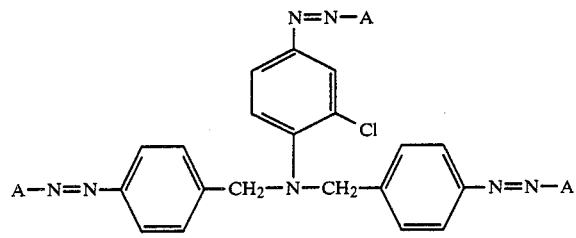
| Compound No. | Fundamental skeleton | A |
|---|---|---|
| I-50 | II | 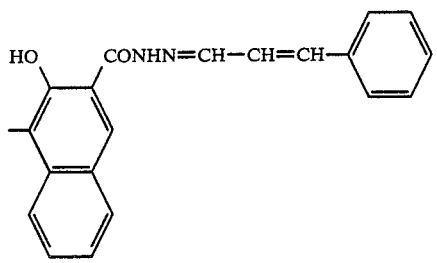 |
| I-51 | II | 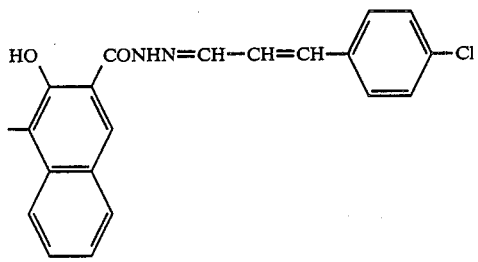 |
| I-52 | II | 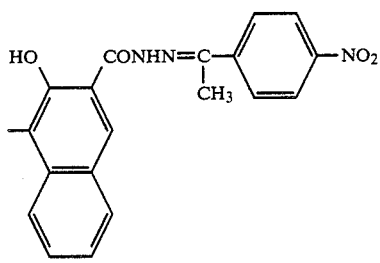 |
| I-53 | II | 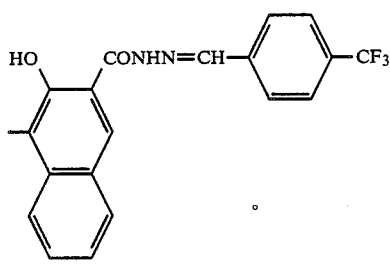 |

-continued
Fundamental skeleton II:
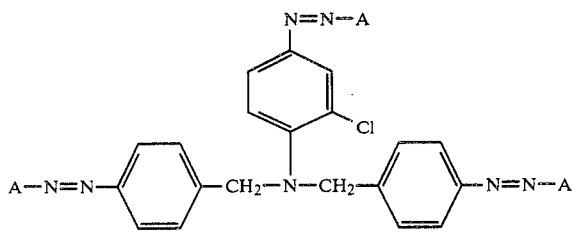
| Compound No. | Fundamental skeleton | A |
|---|---|---|
| I-54 | II | 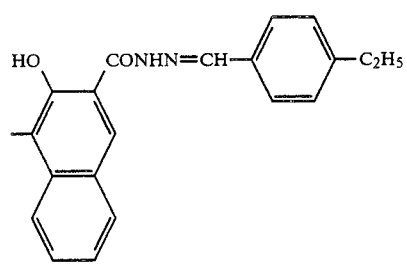 |
| I-55 | II | 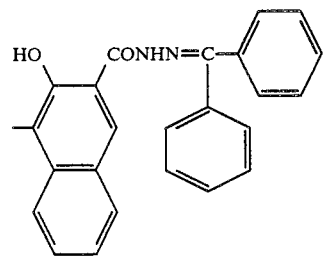 |
| I-56 | II | 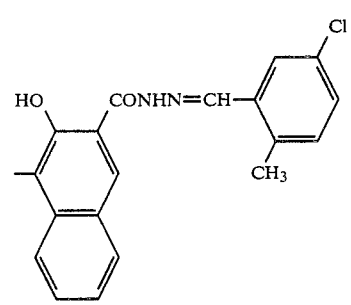 |
| I-57 | II | 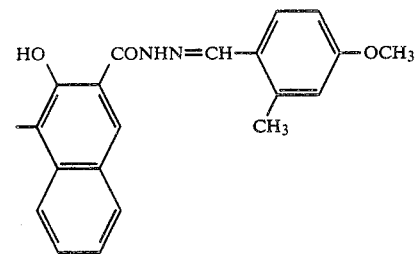 |

-continued
Fundamental skeleton II:
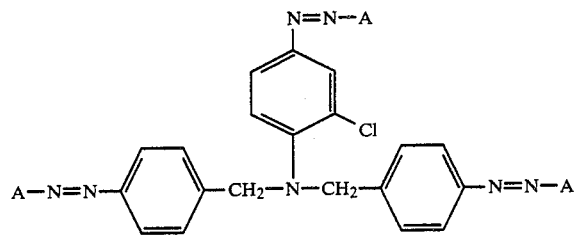
| Compound No. | Fundamental skeleton | A |
|---|---|---|
| I-58 | II | 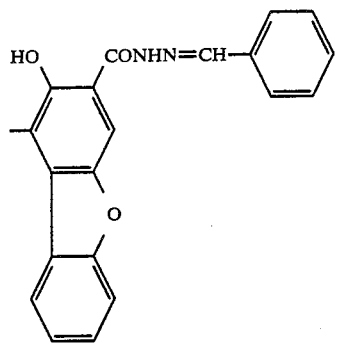 |
| I-59 | II | 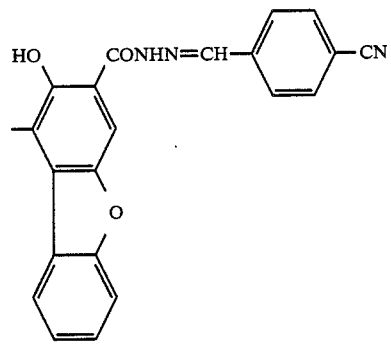 |
| I-60 | II | 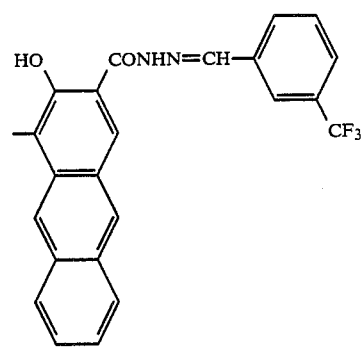 |

-continued
Fundamental skeleton II:
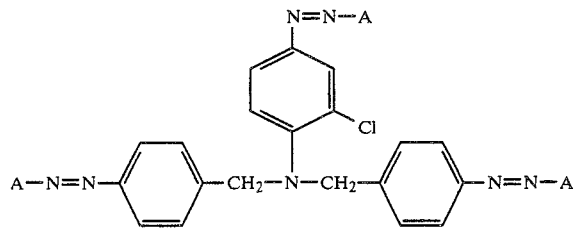
| Compound No. | Fundamental skeleton | A |
|---|---|---|
| I-61 | II | 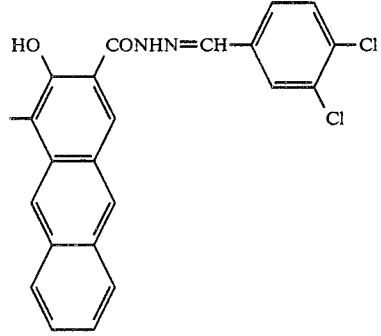 |
| I-62 | II | 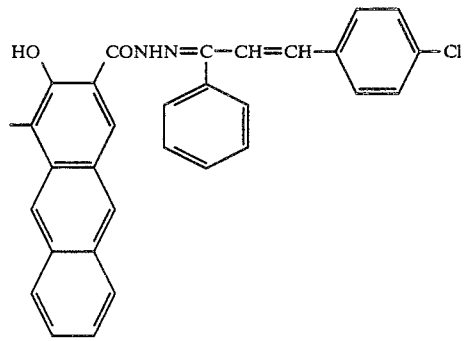 |
| I-63 | II | 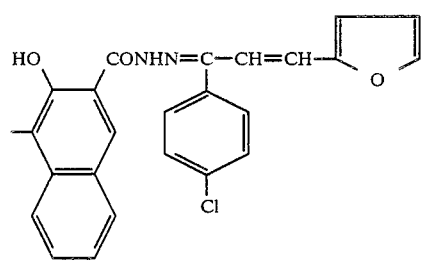 |
| I-64 | II | 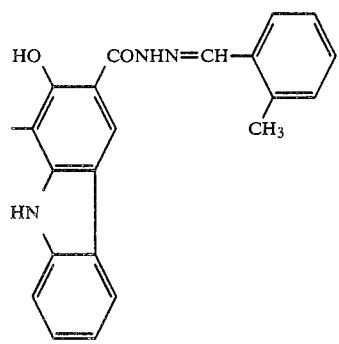 |

-continued
Fundamental skeleton II:
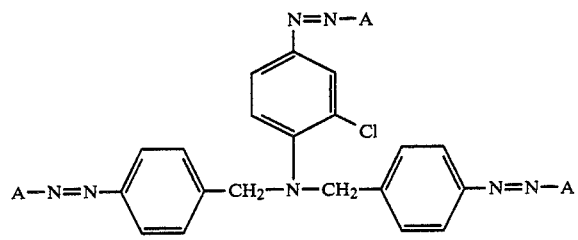
| Compound No. | Fundamental skeleton | A |
|---|---|---|
| I-65 | II | 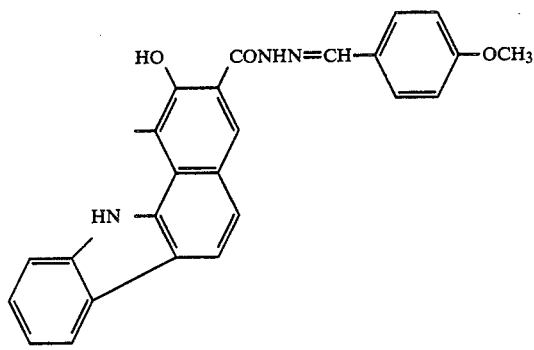 |
| I-66 | II | 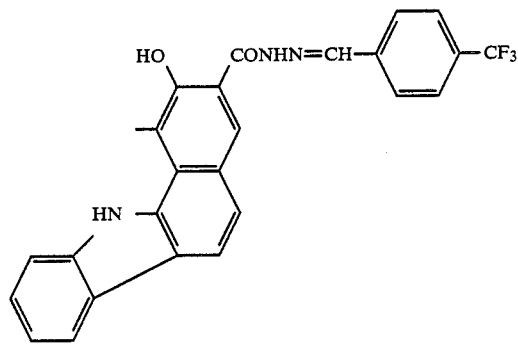 |
| I-67 | II | 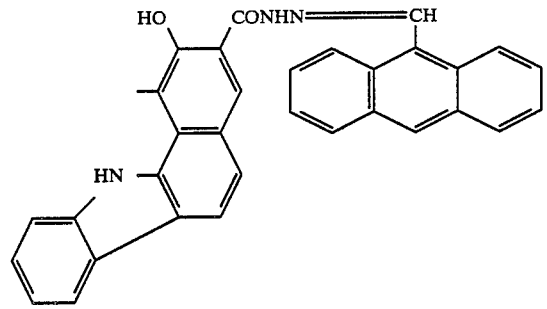 |

-continued
Fundamental skeleton II:
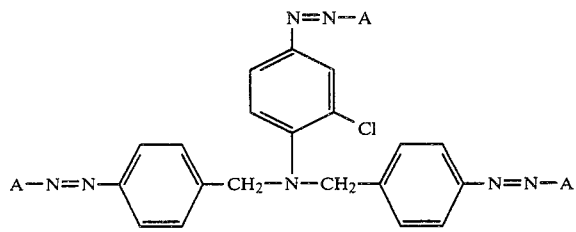
| Compound No. | Fundamental skeleton | A |
|---|---|---|
| I-68 | II | 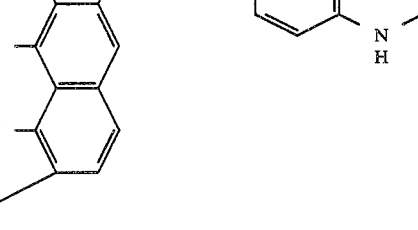 |
| I-69 | II | 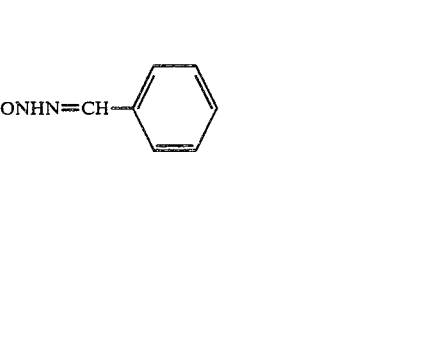 |
| I-70 | II | 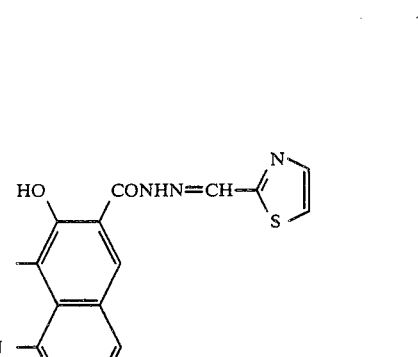 |

| | Fundamental skeleton III: |
|---|---|
| | 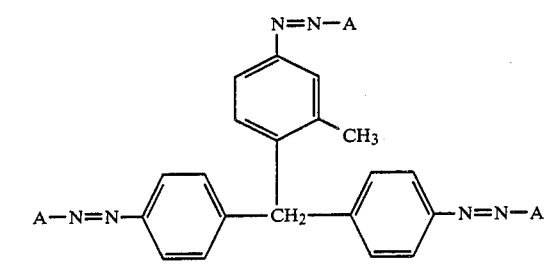 |
| Compound No. | Fundamental skeleton | A |
|---|---|---|
| I-71 | III | 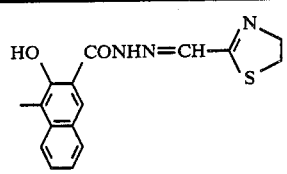 |
| I-72 | III | 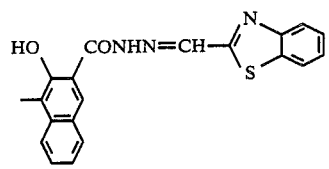 |
| I-73 | III | 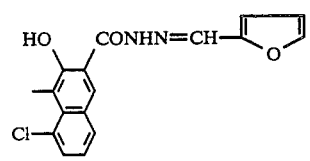 |
| I-74 | III | 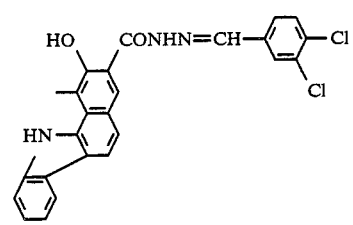 |
| I-75 | III | 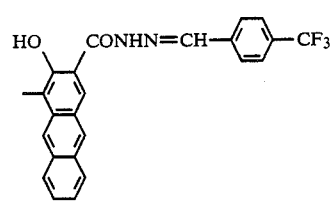 |
| I-76 | III | 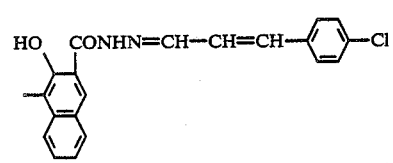 |
| | Fundamental skeleton IV: |
|---|---|
| | 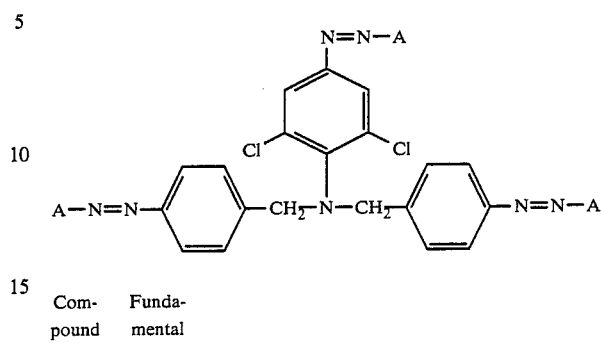 |
| Compound No. | Fundamental skeleton | A |
|---|---|---|
| I-77 | IV | 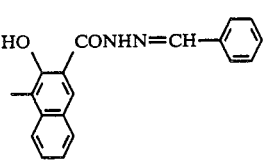 |
| I-78 | " | 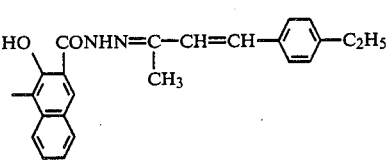 |
| I-79 | IV | 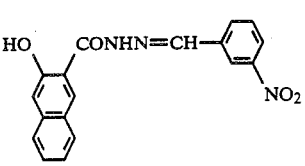 |
| I-80 | IV | 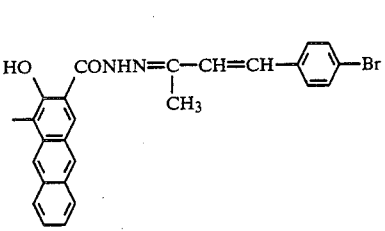 |
| I-81 | IV | 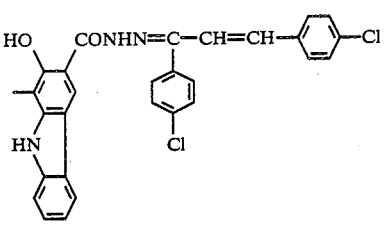 |
| I-82 | IV | 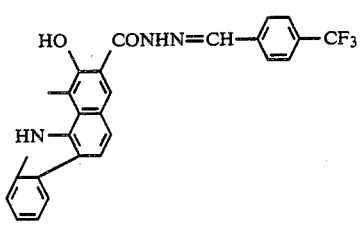 |

Fundamental skeleton IV:
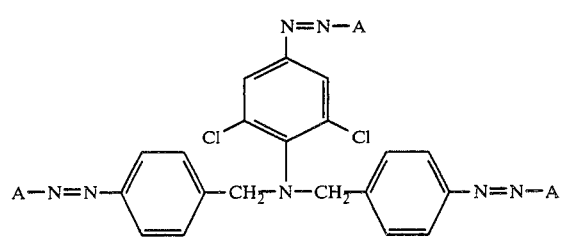
| Compound No. | Fundamental skeleton | A |
|---|---|---|
| I-83 | IV | 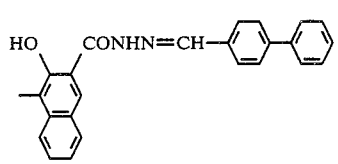 |
Fundamental skeleton V:
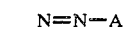
| Compound No. | Fundamental skeleton | A |
|---|---|---|
| I-84 | V | 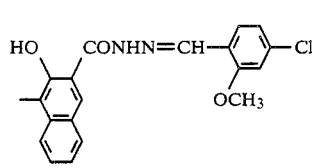 |
| I-85 | V | 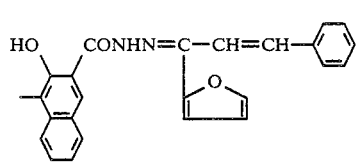 |
| I-86 | V | 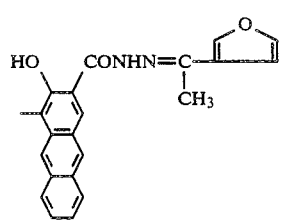 |
Fundamental skeleton V:
| Compound No. | Fundamental skeleton | A |
|---|---|---|
| I-87 | V | 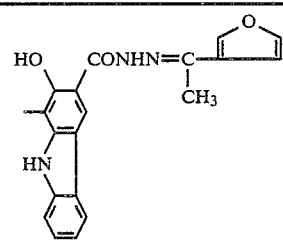 |
| I-88 | V | 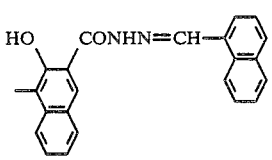 |
| I-89 | V | 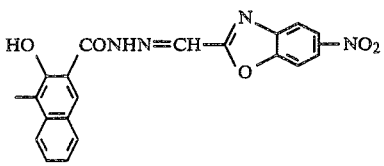 |
| I-90 | V | 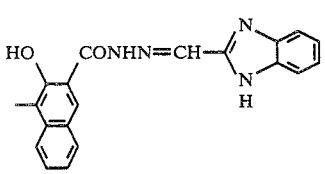 |
Fundamental skeleton VI:
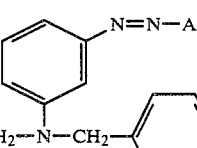
| Compound No. | Fundamental skeleton | A |
|---|---|---|
| I-91 | VI | 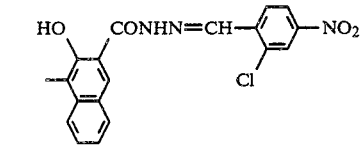 |

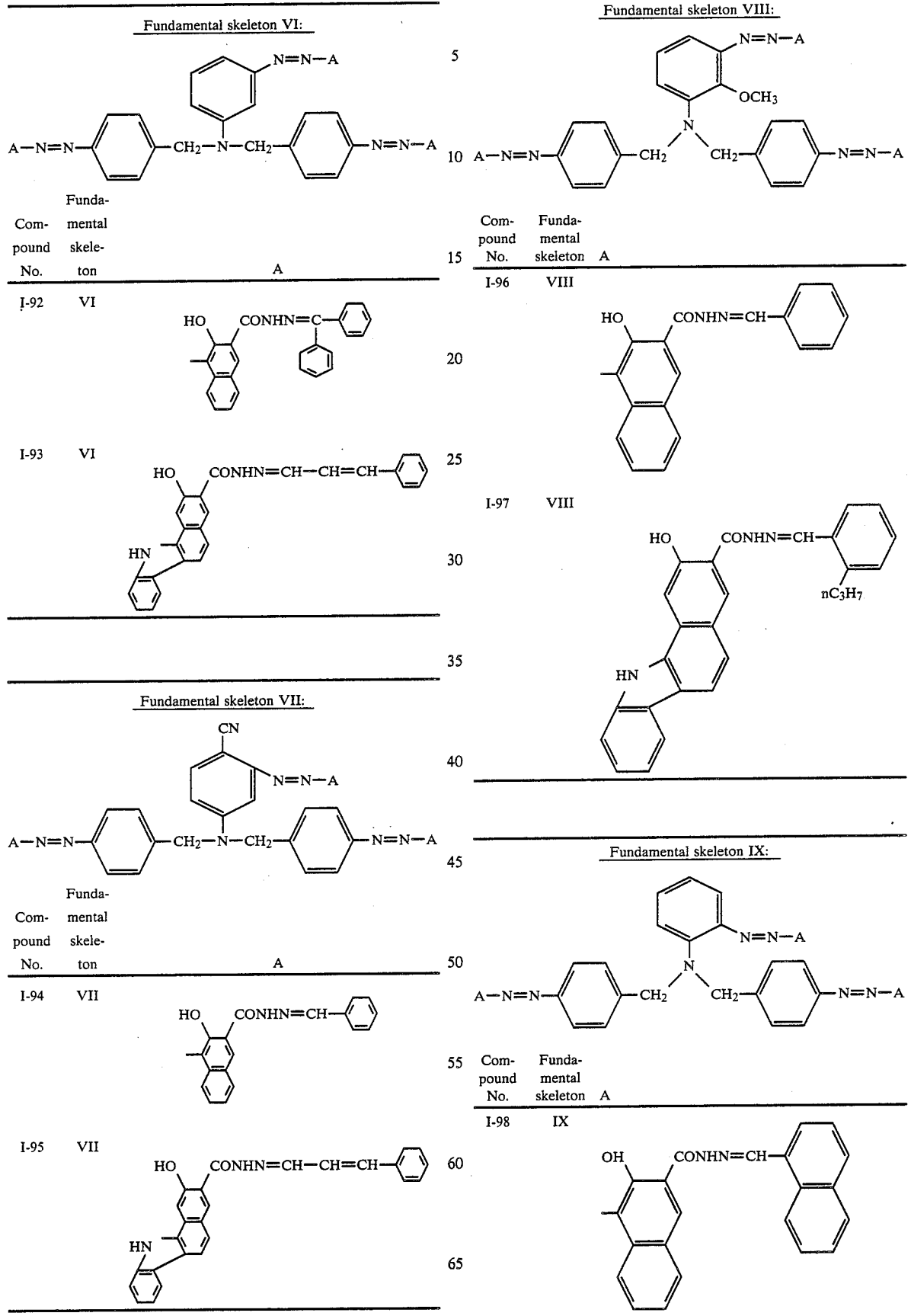

| | | I-99 IX | 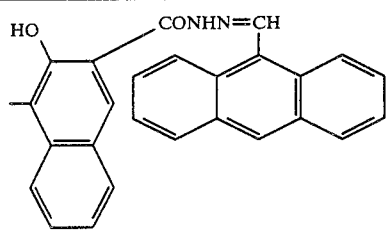 |
| | | I-100 IX | 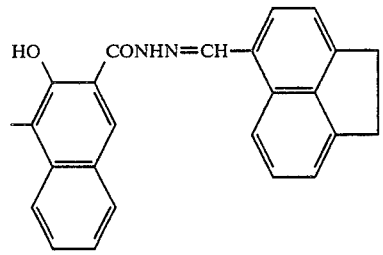 |
Other examples of the compounds having fundamental skeleton I are as follows:
| Compound No. | Fundamental skeleton | A |
|---|---|---|
| II-1 | I | 3-hydroxy-4-methyl-N-phenyl-2-naphthamide |
| II-2 | " | with 2-methyl-4-methoxyphenyl (CH$_3$, OH$_3$) |
| II-3 | " | with 4-ethoxyphenyl (OC$_2$H$_5$) |
| II-4 | " | with 4-bromophenyl (Br) |
| II-5 | " | with 3-cyanophenyl (CN) |
| II-6 | " | with 4-nitrophenyl (NO$_2$) |
| II-7 | " | with 2-ethylphenyl (C$_2$H$_5$) |

| Compound No. | Fundamental skeleton | A |
|---|---|---|
| II-8 | " | 3-hydroxy-4-methyl-N-(3-trifluoromethylphenyl)-2-naphthamide |
| II-9 | " | 3-hydroxy-4-methyl-N-(2,4-dimethoxyphenyl)-2-naphthamide |
| II-10 | " | 3-hydroxy-4-methyl-N-(4-chloro-3-nitrophenyl)-2-naphthamide |
| II-11 | " | 3-hydroxy-4-methyl-N-(2-methyl-4-nitrophenyl)-2-naphthamide |
| II-12 | " | 3-hydroxy-4-methyl-N-(2-naphthyl)-2-naphthamide |
| II-13 | " | 3-hydroxy-4-methyl-N-(1-naphthyl)-2-naphthamide |
| II-14 | " | 3-hydroxy-4-methyl-2-naphthamide (CONH) |
| II-15 | " | 3-hydroxy-4-methyl-2-naphthothioic acid (COSH) |
| II-16 | " | phenyl 3-hydroxy-4-methyl-2-naphthoate (COO-Ph) |

| Compound No. | Fundamental skeleton | A |
|---|---|---|
| II-17 | " | 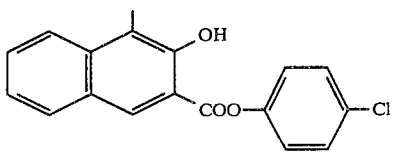 |
| II-18 | " | 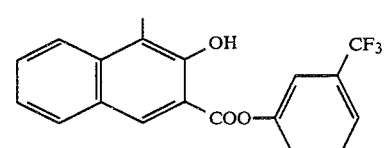 |
| II-19 | " | 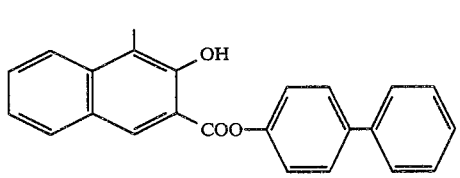 |
| II-20 | " | 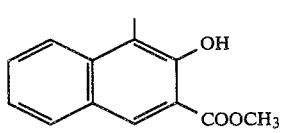 |
| II-21 | " | 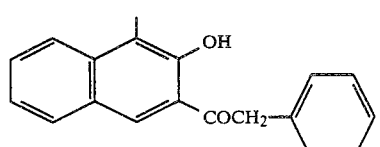 |
| II-22 | " | 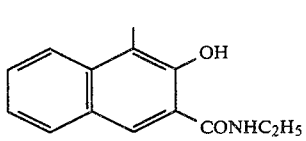 |
| II-23 | " | 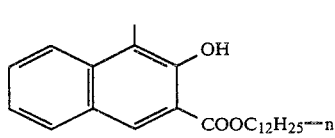 |
| II-24 | " | 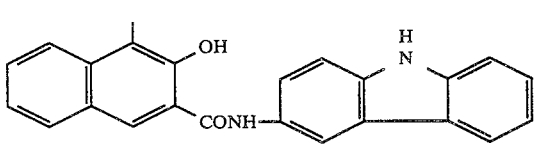 |
| II-25 | " | 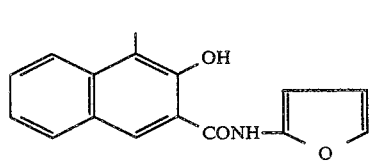 |

-continued

| Compound No. | Fundamental skeleton | A |
|---|---|---|
| II-26 | " | 3-hydroxy-anthracene-2-carboxanilide |
| II-27 | " | 3-hydroxy-anthracene-2-carboxylic acid |
| II-28 | " | 3-hydroxy-anthracene-2-sulfonic acid |
| II-29 | " | 2,3-dihydroxynaphthalene |
| II-30 | " | 3-(phenylcarbonyloxy)-2-hydroxynaphthalene |
| II-31 | " | 3-hydroxy-N-(4-trifluoromethylphenyl)anthracene-2-carboxamide |
| II-32 | " | 3-hydroxy-N-methyl-N-phenylnaphthalene-2-carboxamide |
| II-33 | " | 3-hydroxy-N,N-diphenylnaphthalene-2-carboxamide |
| II-34 | " | 3-hydroxy-N-(2-pyridyl)naphthalene-2-carboxamide |

| Compound No. | Fundamental skeleton | A |
|---|---|---|
| II-35 | " | 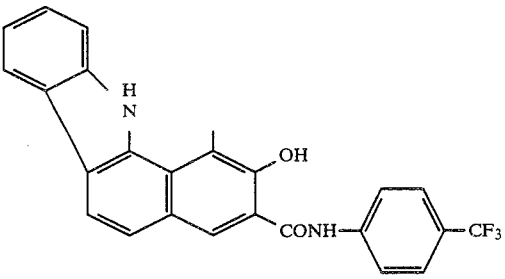 |
| II-36 | " | 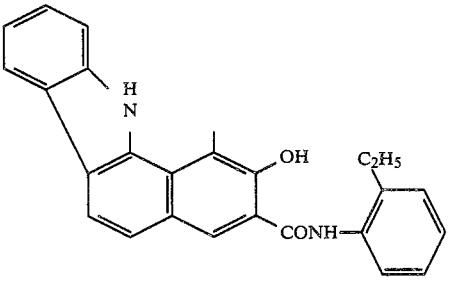 |
| II-37 | " | 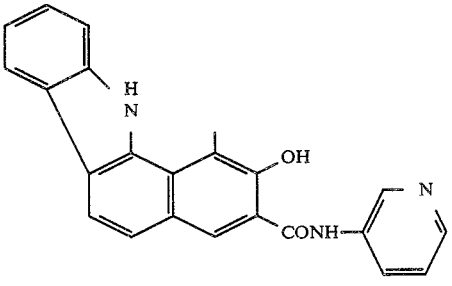 |
| II-38 | " | 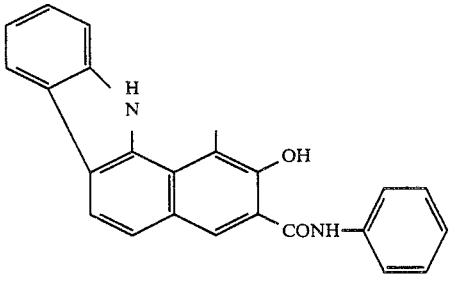 |
| II-39 | " | 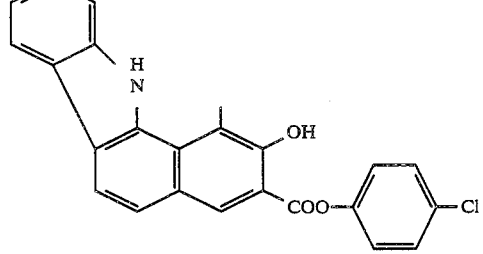 |

-continued

| Compound No. | Fundamental skeleton | A |
|---|---|---|
| II-40 | " | (phenanthrene with OH, CONH-3,4-dichlorophenyl) |
| II-41 | " | (carbazole with OH, CONH-phenyl) |
| II-42 | " | (carbazole with OH, CONH-3,5-dichlorophenyl) |
| II-43 | " | (carbazole with OH, CON(CH₃)-phenyl) |
| II-44 | " | (naphtho-carbazole with OH, CONH-phenyl) |
| II-45 | " | (phenanthro-carbazole with OH, CONH-3-CF₃-phenyl) |
| II-46 | " | (dibenzofuran with OH, CONH-2-C₂H₅-phenyl) |
| II-47 | " | (dibenzofuran with OH, CONHC₄H₉—n) |

-continued

| Compound No. | Fundamental skeleton | A |
|---|---|---|
| II-48 | " | (3-methyl-2-hydroxy-dibenzofuran-CONH-pyrimidin-2-yl) |
| II-49 | " | (1-phenyl-5-hydroxypyrazole) |
| II-50 | " | (1-phenyl-3-anilino-pyrazole) |
| II-51 | " | (1-(4-chlorophenyl)-3-ethyl-pyrazole) |
| II-52 | " | (1-(3-chlorophenyl)-3-benzamido-pyrazole) |
| I-53 | " | (N-ethyl naphthalimide with OH) |

| Compound No. | Fundamental skeleton | A |
|---|---|---|
| I-54 | " | 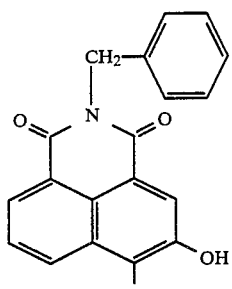 |
| I-55 | " | 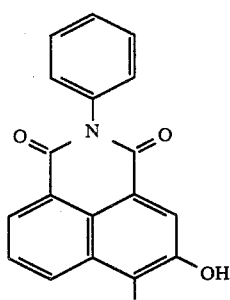 |
| I-56 | " | 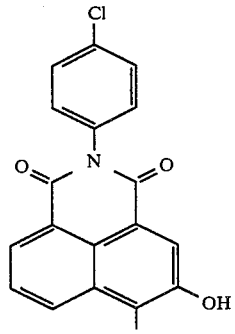 |
| II-57 | " | 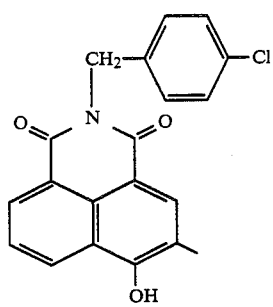 |

-continued

| Compound No. | Fundamental skeleton | A |
|---|---|---|
| II-58 | " | (naphthalene-1,8-dicarboximide with N-(4-methoxyphenyl), 3-methyl, 4-OH substituents) |

Other examples of the compounds having fundamental skeleton II are as folows:

| Compound No. | Fundamental skeleton | A |
|---|---|---|
| II-59 | II | 4-methyl-3-hydroxy-2-naphthyl-CONH-phenyl |
| II-60 | " | 4-methyl-3-hydroxy-2-naphthyl-SO$_2$NH-phenyl |
| II-61 | " | 4-methyl-3-hydroxy-2-naphthyl-SO$_2$NH-C$_6$H$_4$-NO$_2$ |
| II-62 | " | 4-methyl-3-hydroxy-2-naphthyl-CONHC$_2$H$_4$OH |
| II-63 | " | 4-methyl-3-hydroxy-2-naphthyl-CONH-(2-phenylindol-5-yl) |
| II-64 | " | 4-methyl-3-hydroxy-2-naphthyl-CONH-(3,4-dichlorophenyl) |
| II-65 | " | 3-hydroxy-2-anthryl-COOH |
| II-66 | " | 3-hydroxy-2-anthryl-CONH-C$_6$H$_4$-CF$_3$ |
| II-67 | " | (5-anilino-4-methyl-3-hydroxy-6-substituted-2-naphthyl-CONH-(2-isopropylphenyl)) |

Fundamental skeleton X:

$$A-N=N-\text{C}_6\text{H}_4-\text{CH}_2-\text{N}-\text{CH}_2-\text{C}_6\text{H}_4-N=N-A$$
with N=N-A and CN substituents on central phenyl

| Compound No. | Fundamental skeleton | A |
|---|---|---|
| II-68 | X | 4-methyl-3-hydroxy-2-naphthyl-COOC$_6$H$_{13}$-n |
| II-69 | " | 4-methyl-3-hydroxy-2-naphthyl-CONH-C$_6$H$_4$-Cl (3-Cl) |
| II-70 | " | 4-methyl-3-hydroxy-2-naphthyl-CON(CH$_3$)-C$_6$H$_4$-Cl |
| II-71 | " | 4-methyl-3-hydroxy-2-naphthyl-CONH-(1H-indazol-5-yl) |
| II-72 | " | (carbazole-based, 4-methyl-3-hydroxy)-CONH-C$_6$H$_4$-CF$_3$ |

Fundamental skeleton X:

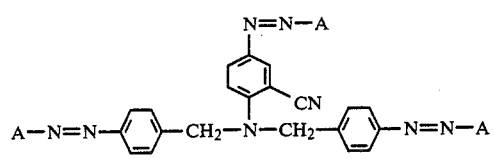

| Compound No. | Fundamental skeleton A | |
|---|---|---|
| II-73 | " | 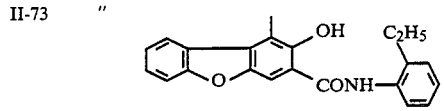 |
| II-74 | " | 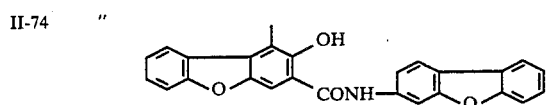 |
| II-75 | " | 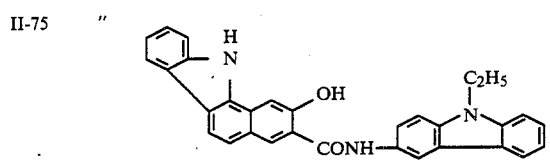 |
| II-76 | " | 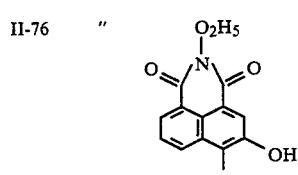 |
| II-77 | " | 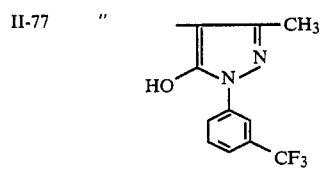 |

Other examples of the compounds having fundamental skeleton III are as follows:

| Compound No. | Fundamental skeleton A | |
|---|---|---|
| II-78 | III | 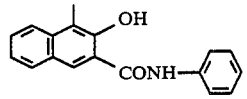 |
| II-79 | " | 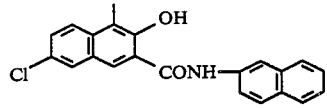 |
| II-80 | " | 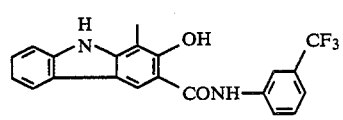 |

| Compound No. | Fundamental skeleton A | |
|---|---|---|
| II-81 | " | 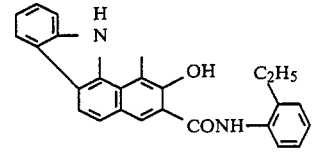 |
| II-82 | " | 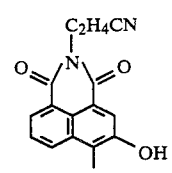 |

Fundamental skeleton XI:

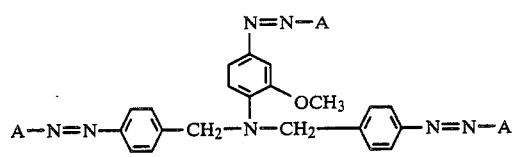

| Compound No. | Fundamental skeleton A | |
|---|---|---|
| II-83 | XI | 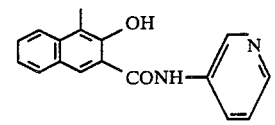 |
| II-84 | " | 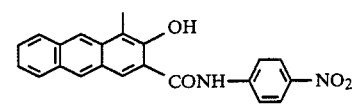 |
| II-85 | " | 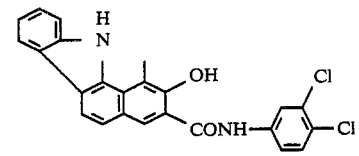 |
| II-86 | " | 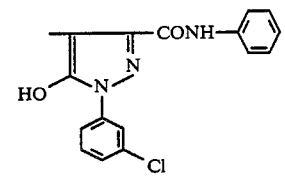 |

Other examples of the compounds having fundamental skeleton IV are as follows:

| Compound No. | Fundamental skeleton | A |
|---|---|---|
| II-87 | IV | 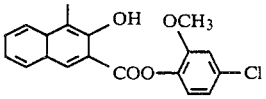 |
| II-88 | " | 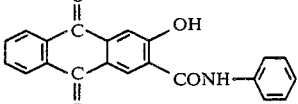 |
| II-89 | " | 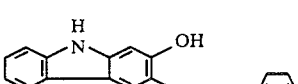 |
| II-90 | " | 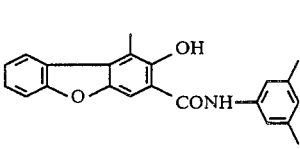 |
| II-91 | " | 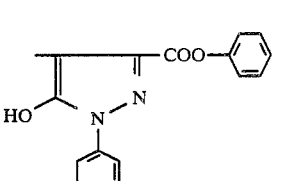 |
Other examples of the compounds having fundamental skeleton VI are as follows:
| Compound No. | Fundamental skeleton | A |
|---|---|---|
| II-92 | VI | 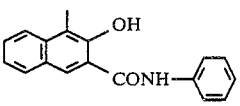 |
| II-93 | " | 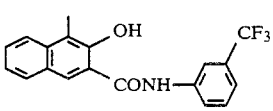 |
| II-94 | " | 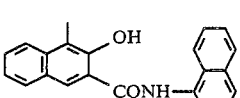 |
| II-95 | " | 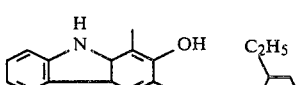 |
| II-96 | " | 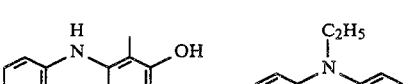 |
| II-97 | " | 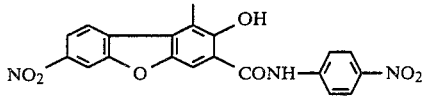 |
| II-98 | " | 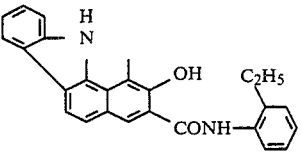 |
| II-99 | " | 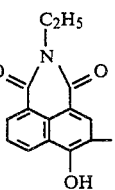 |
Fundamental skeleton XII:
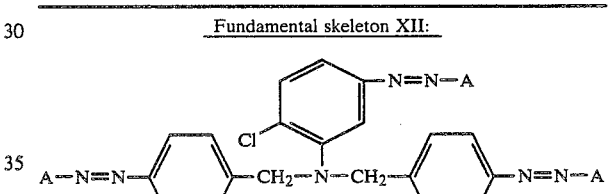
| Compound No. | Fundamental skeleton | A |
|---|---|---|
| II-100 | XII | 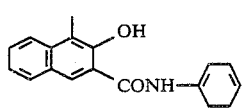 |
| II-101 | " | 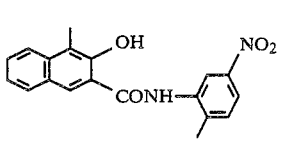 |
| II-102 | " | 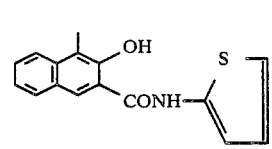 |
| II-103 | " | 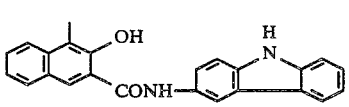 |
| II-104 | " | 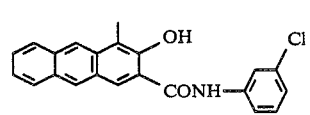 |

Fundamental skeleton XII:

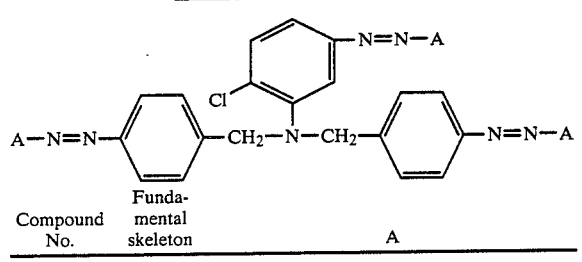

| Compound No. | Fundamental skeleton | A |
|---|---|---|
| II-105 | " | 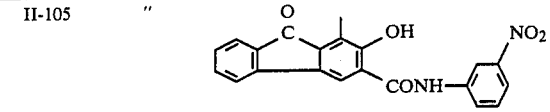 |
| II-106 | " | 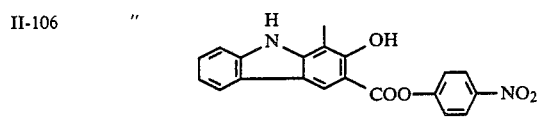 |
| II-107 | " | 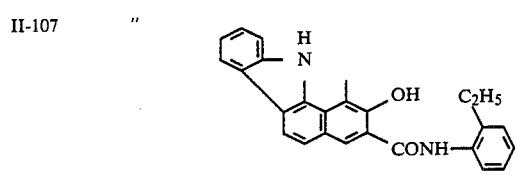 |
| II-108 | " | 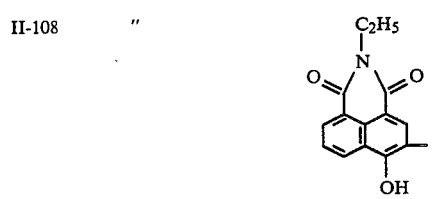 |
| II-109 | " | 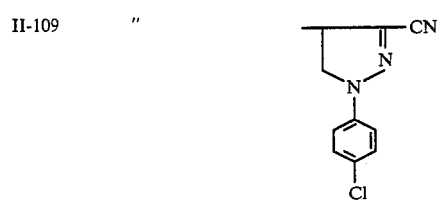 |

Fundamental skeleton XIII:

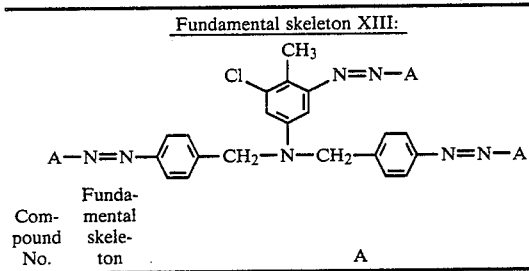

| Compound No. | Fundamental skeleton | A |
|---|---|---|
| II-110 | XIII | 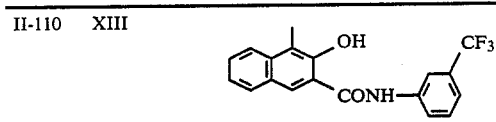 |
| II-111 | " | 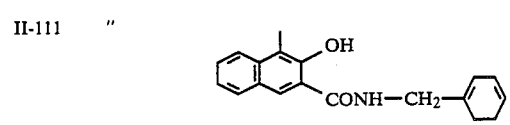 |

Fundamental skeleton XIII:

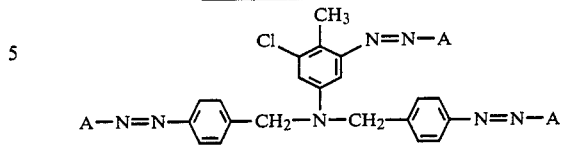

| Compound No. | Fundamental skeleton | A |
|---|---|---|
| II-112 | " | 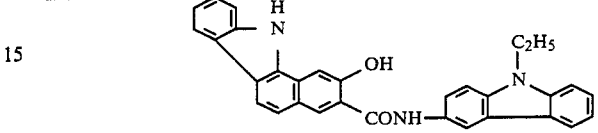 |

Other examples of the compounds having fundamental skeleton IX are as follows:

| Compound No. | Fundamental skeleton | A |
|---|---|---|
| II-113 | IX | 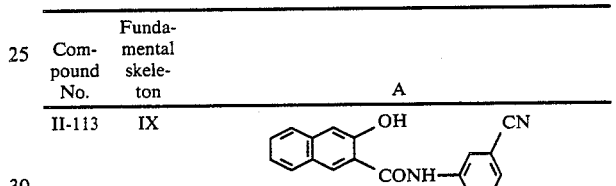 |
| II-114 | " | 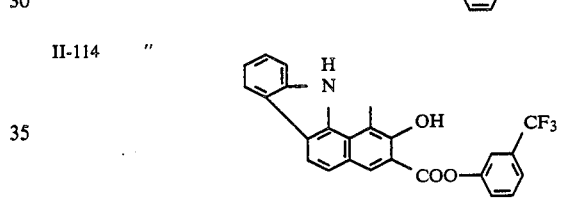 |

The azo pigments represented by the general formula [I] can be easily synthesized by customarily diazotising a triamine represented by the general formula

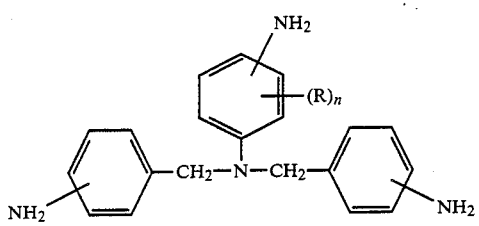

and coupling with a corresponding coupler in the presence of an alkali or, alternatively, isolating the hexazonium salt of said triamine in the form of borofluoride salt or zinc chloride double salt and coupling with a coupler in the presence of an alkali in a suitable solvent such as, for example, N,N-dimethylformamide or dimethyl sulfoxide.

The synthesis of typical examples of azo pigments used in this invention is described below.

SYNTHESIS EXAMPLE 1

(Compound No. I-2)

A mixture of 17.2 g (0.1 mole) of p-nitrobenzyl chloride and 5.6 g (0.04 mole) of p-nitroaniline was heated at 70° C. to obtain a solution. To the solution, was added 35 ml of 3N aqueous sodium hydroxide solution. The mixture was stirred at 70° C. for about one hour, then at 100° C. for 5 hours. The reaction mixture was cooled down to room temperature to precipitate a hard reddish brown solid. The solid was separated, washed thoroughly with water, then with alcohol, and finally with hot acetone to yield 7.1 g of a yellowish orange powder. This powder, a trinitro compound, was reduced with concentrated hydrochloric acid and stannous chloride to yield a yellow powder. Upon examination of the IR absorption spectrum (KBr method), it was found that the absorption at 1340 cm$^{-1}$ due to a nitro group had disappeared and, instead, absorption due to a plurality of amino groups was observed at about 3300 cm$^{-1}$.

A 0.64 g portion of the triamine compound, melting at 215.5°–217° C. and having the formula

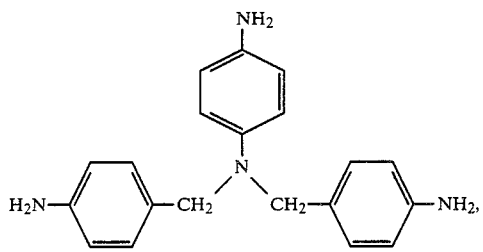

which was obtained above, was dispersed in 2.5 ml of concentrated hydrochloric acid and diluted with 30 ml of ice water. To the dispersion, while being cooled in ice, was added an aqueous sodium nitrite solution to effect diazotization. After removal of impurities by the addition of a small amount of activated carbon, the reaction mixture was slowly added to an ice-cooled solution of 2.0 g of 2-hydroxy-3-(4'-chlorobenzaldehyde)-naphthoic acid hydrazone (melting point: 272.0°–274° C.) in a mixture of 50 ml of dimethyl sulfoxide and 1.0 g of triethylamine. After stirring for about 2 hours with cooling in ice, the precipitated dark blue powder was collected, washed thoroughly with hot water, then successively with methanol and acetone to yield 1.82 g of a dark blue powder (decomp. at 347° C.). The IR absorption spectrum (KBr method) of this compound was as shown in FIG. 1.

SYNTHESIS EXAMPLE 2

(Compound No. I-5)

A dark reddish purple powder (decomposed at 352° C.) was obtained in nearly the same manner as in Synthesis Example 1, except that 2-hydroxy-3-(4'-cyanobenzaldehyde)-naphthoic acid hydrazone was used in place of the Naphthol AS. The IR absorption spectrum of said powder showed distinctly an absorption due to the cyano group at 2200 cm$^{-1}$.

SYNTHESIS EXAMPLE 3

(Compound No. I-21)

A dark blue powder (decomposed at 360° C. or above) having a metallic luster was obtained in nearly the same manner as in Synthesis Example 1, except that 2-hydroxy-11H-benzo[a]-carbazole-3-phenylaldehyde hydrazone was used in place of the Naphthol AS.

SYNTHESIS EXAMPLE 4

(Compound No. I-39)

A diazotized solution obtained in the same manner as in Synthesis Example 1 was gradually added to an ice-cooled solution of 2.1 g of 2-hydroxy-3-(9'-anthraldehyde)-naphthoic acid hydrazone and 1.2 g of potassium acetate in 150 ml of dimethylformamide. The mixture was stirred for about 2 hours while being cooled in ice. The precipitated dark blue powder was collected and washed thoroughly with hot water, then successively with acetone and chloroform to yield 2.3 g of a dark purple powder (decomposed at 360° C. or above) having a metallic luster.

SYNTHESIS EXAMPLE 5

(Compound No. II-1)

A mixture of 17.2 g (0.1 mole) of p-nitrobenzyl chloride and 5.6 g (0.04 mole) of p-nitroaniline was heated at 70° C. to form a solution. To the solution, was added 35 ml of 3N aqueous sodium hydroxide solution. The mixture was stirred at 70° C. for about one hour, then at 100° C. for 5 hours. The reaction mixture was cooled down to room temperature to precipitate a reddish brown hard solid. The solid was collected, washed thoroughly with water, then with alcohol, and finally with hot acetone to yield 7.1 g of a yellowish orange powder. This powder, a trinitro compound, was reduced with concentrated hydrochloric acid and stannous chloride to yield a yellow powder. Upon examination of the IR absorption spectrum (KBr tablet), it was found that the absorption at 1340 cm$^{-1}$ due to nitro group had disappeared and, instead, absorption due to a plurality of amino groups was observed at about 3300 cm$^{-1}$.

A 0.64 g portion of the triamino compound, melting at 215.5°–217° C. and having the formula

Figure 3:
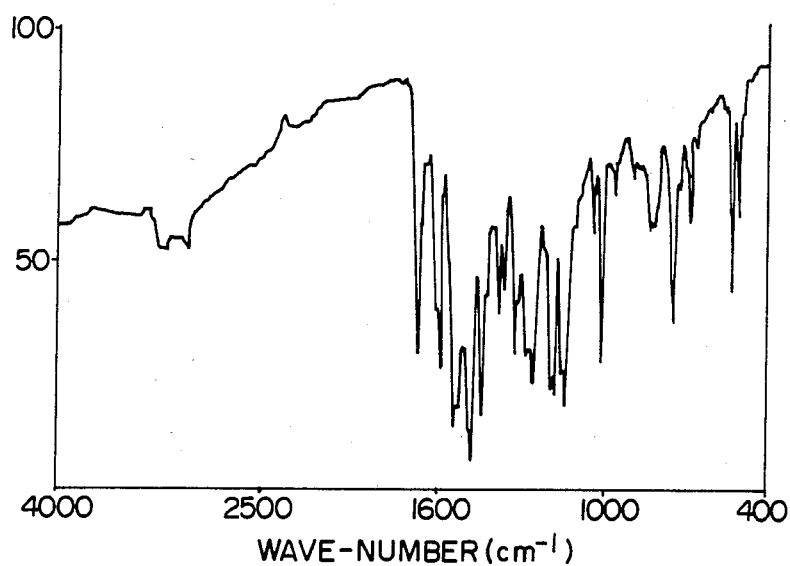
FIG. 3 is the IR absorption spectrum (KBr method) of the pigment of this invention (Synthesis Example II-1).

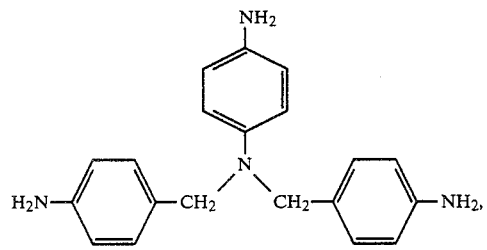

which was obtained above, was dispersed in 2.5 ml of concentrated hydrochloric acid and diluted with 30 ml of ice water. To the dispersion, while being cooled in ice, was added an aqueous sodium nitrite solution to effect diazotization. After removal of impurities by the addition of a small amount of activated carbon, the reaction mixture was slowly added to an ice-cooled solution of 1.7 g of Naphthol AS in a mixture of 50 ml of dimethyl sulfoxide and 1.0 g of triethylamine. After stirring for about 2 hours with cooling in ice, the precipitated black powder was collected, washed thoroughly with hot water, then successively with methanol and acetone to yield 1.82 g of a dark blue powder (decomposed at 338° C.). The IR absorption spectrum (KBr tablet) was as shown in FIG. 3.

SYNTHESIS EXAMPLE 6

(Compound No. II-5)

A dark purple powder (decomposed at 334° C.) was obtained in substantially the same manner as in Synthesis Example 5, except that 2-(3'-cyanophenyl)carbamoyl-3-naphthol was used in place of the Naphthol AS. The IR absorption spectrum (KBr tablet) of said powder showed distinctly an absorption due to cyano group at 2200 cm$^{-1}$.

SYNTHESIS EXAMPLE 7

(Compound No. II-38)

A dark blue powder (decomposed at 350° C. or above) having a metallic luster was obtained in substantially the same manner as in Synthesis Example 5, except that 2-hydroxy-11H-benzo[a]carbazole-3-carboxyanilide was used in place of the Naphthol As.

SYNTHESIS EXAMPLE 8

(Compound No. II-42)

A diazotized solution obtained in the same manner as in Synthesis Example 5 was gradually added to an ice-cooled solution of 2.3 g of 2-hydroxycarbazole-3-carboxy-3', 5'-dichloroanilide and 1.2 g of potassium acetate in 150 ml of dimethylformamide. The mixture was stirred for about 2 hours while being cooled in ice. The precipitated dark blue powder was collected and washed thoroughly with hot water, then successively with acetone and chloroform to yield 2.2 g of a black powder (decomposed at 350° C. or above) having a metallic luster.

Other azo pigments of this invention may also be obtained in a manner similar to that in above Synthesis Examples.

The electrophotographic photoconductive material of this invention has a photosensitive layer containing one or more of the azo pigments represented by the general formula [I]. There are known various types of photosensitive layer. The photosensitive layer of the photoconductive material of this invention may be any of the known types, but is normally of the following types:

1. A photosensitive layer comprising an azo pigment.
2. A photosensitive layer of an azo pigment dispersed in a binder.
3. A photosensitive layer of an azo pigment dispersed in a known charge transfer substance.
4. A photosensitive layer of the laminate type comprising the photosensitive layer 1, 2, or 3 used as charge generating layer and the charge transfer layer containing a known charge transfer substance.

The azo pigment represented by the general formula [I] generates in a high efficiency a charge carrier upon absorption of light energy. The generated carrier can be transferred through the medium of azo pigment but more desirably through the medium of a known charge transfer substance. From such a viewpoint, the photosensitive layers of the types 3 and 4 are especially preferred.

The charge transfer substances are generally classified into two groups. The substances of the first group transfer the charge by electron propagation and those of the second group by hole propagation. Substances of both groups can be used in the photosensitive layer of the present photoconductive material. A mixture of substances of the same group or different groups can also be used.

The substances of the first group are electron attractive compounds having electron attractive groups such as nitro group, cyano group, ester group, and the like. As examples of such compounds, mention may be made of nitrated fluroenones such as 2,4,7-trinitrofluorenone and 2,4,5,7-tetranitrofluorenone; tetracyanoquinodimethane, tetracyanoethylene, 2,4,5,7-tetranitroxanthone, 2,4,8-trinitrothioxanthone, and polymers of these compounds.

The substances of the second group are electron donative, organic photoconductive compounds. As examples of such compounds, mention may be made of the following:

Hydrazones:

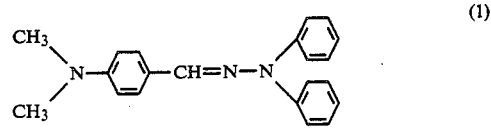

(1)

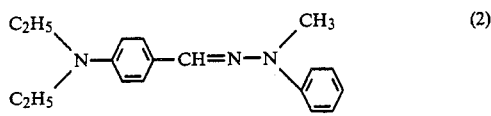

(2)

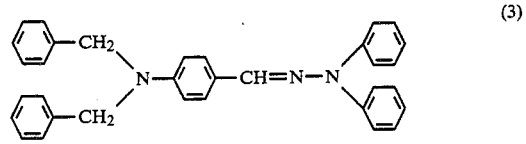

(3)

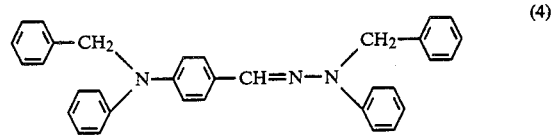

(4)

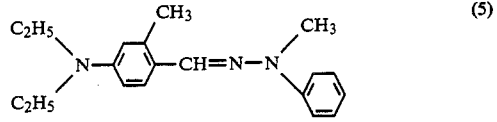

(5)

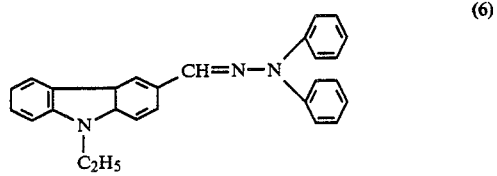

(6)

-continued
Hydrazones:
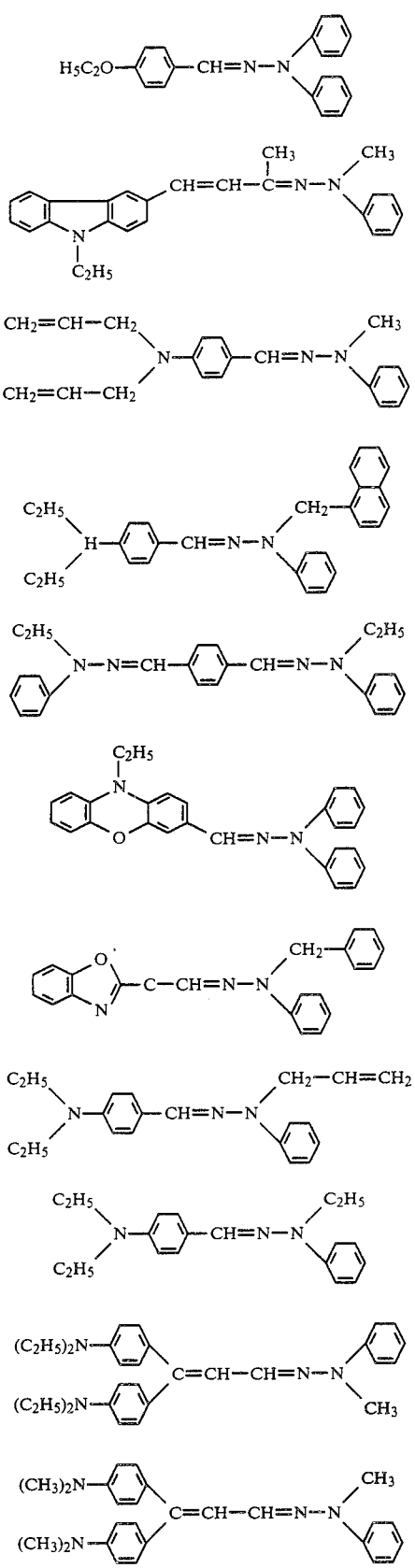
-continued
Hydrazones:
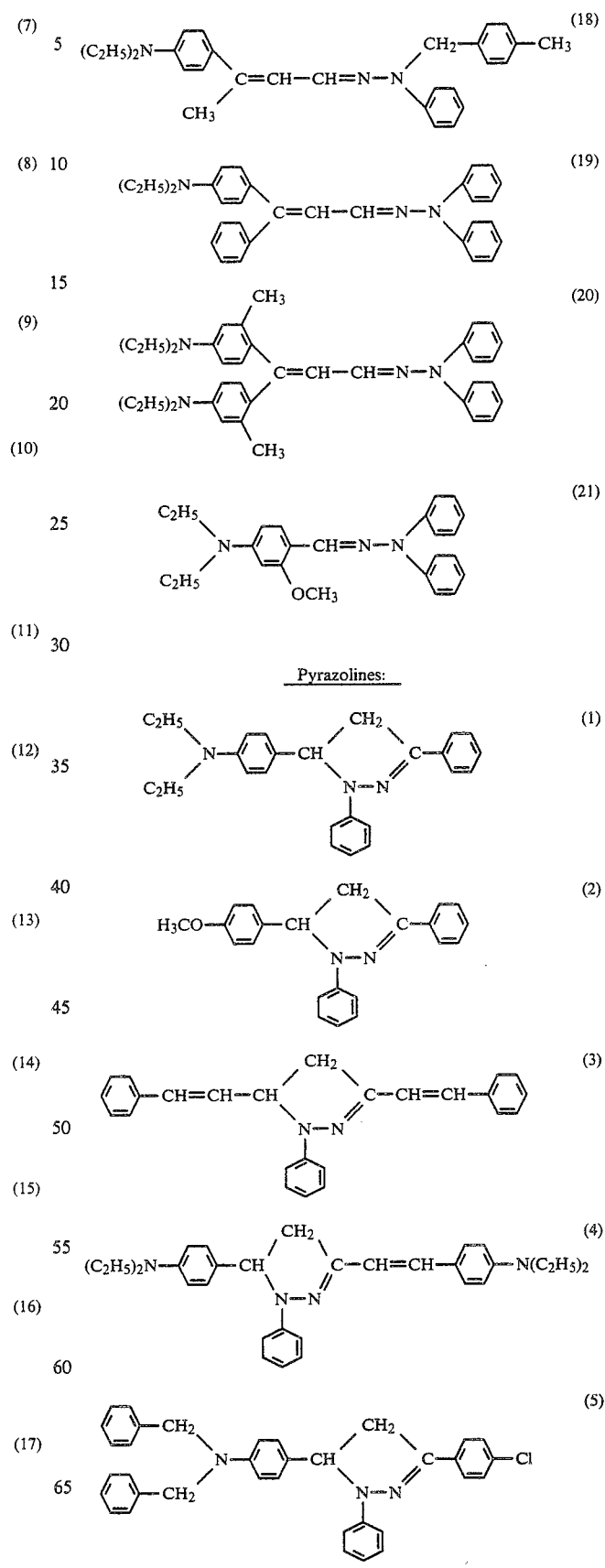

-continued
Pyrazolines:
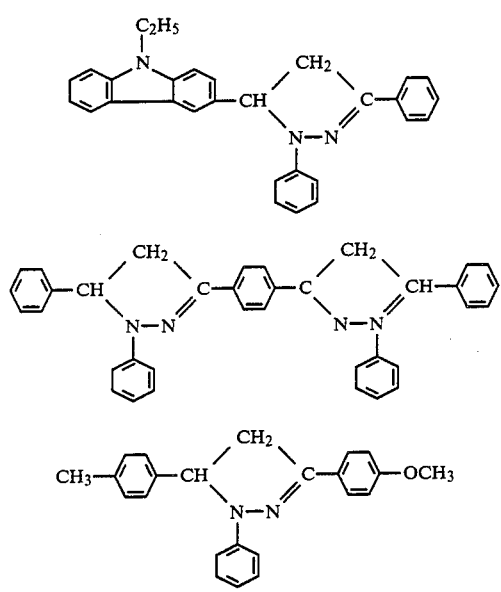
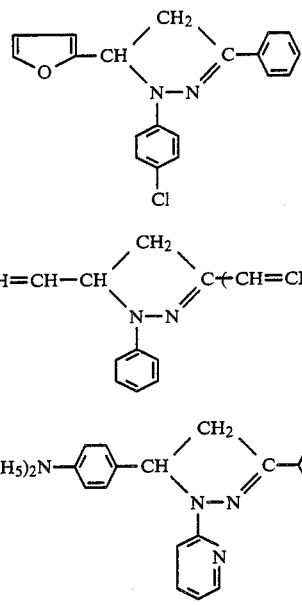
Diarylalkanes:
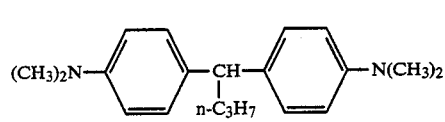
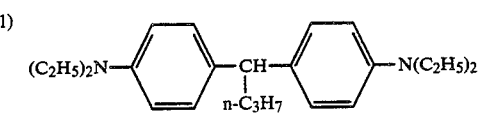
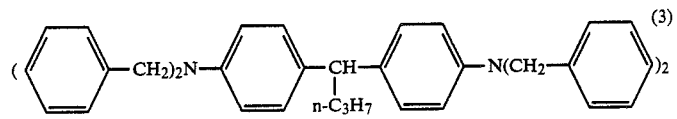
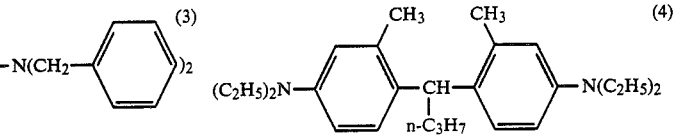
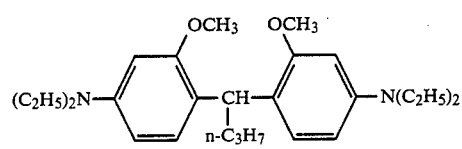
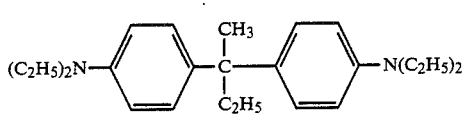
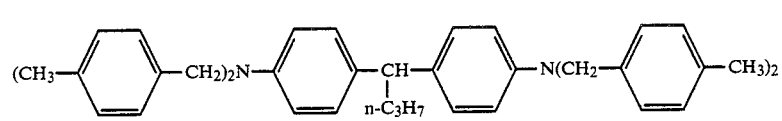
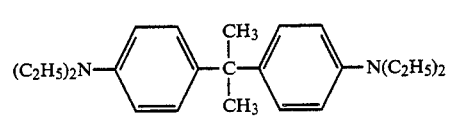
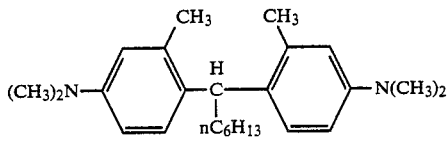
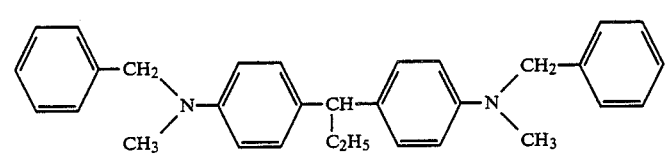

-continued
Diarylalkanes:
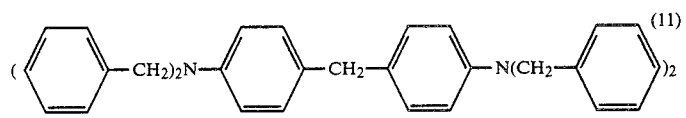 (11)
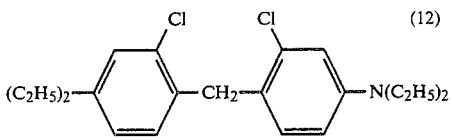 (12)
-continued
Alkylenediamines:
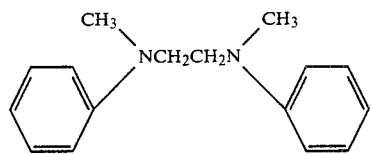 (1)
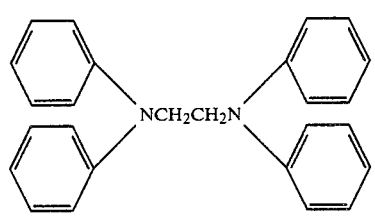 (2)
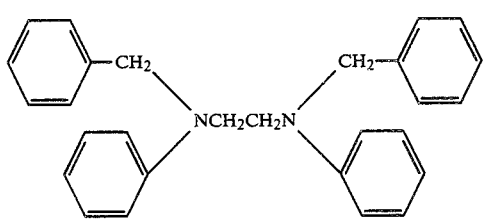 (3)
Alkylenediamines:
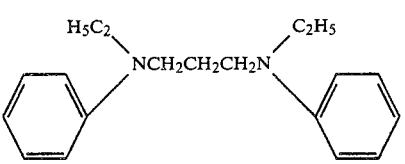 (4)
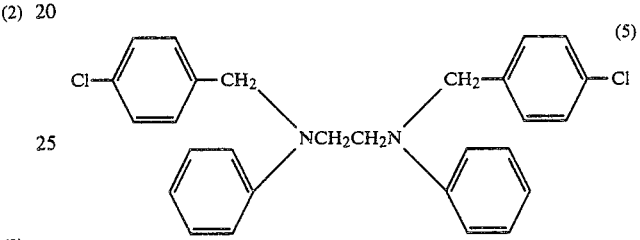 (5)
Dibenzylanilines:
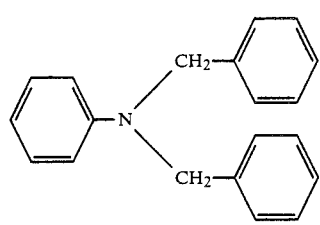 (1)
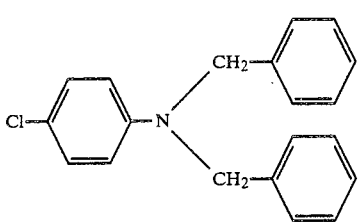 (2)
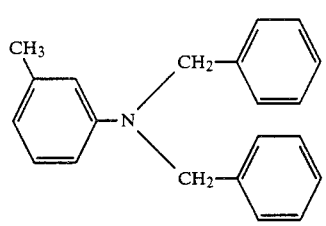 (3)
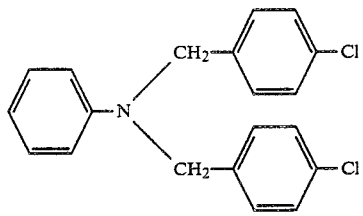 (4)
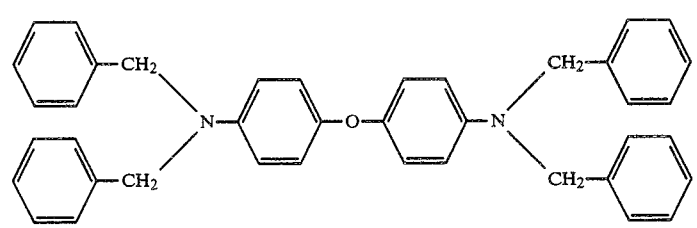 (5)

-continued
Dibenzylanilines:
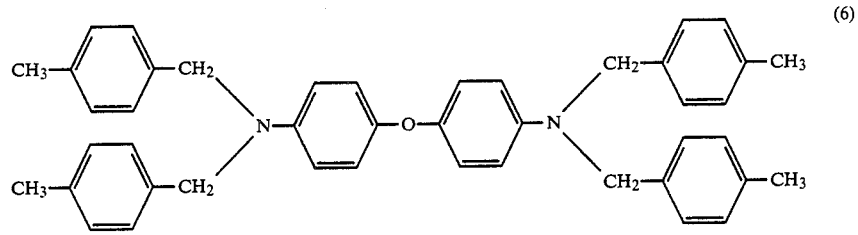
(6)
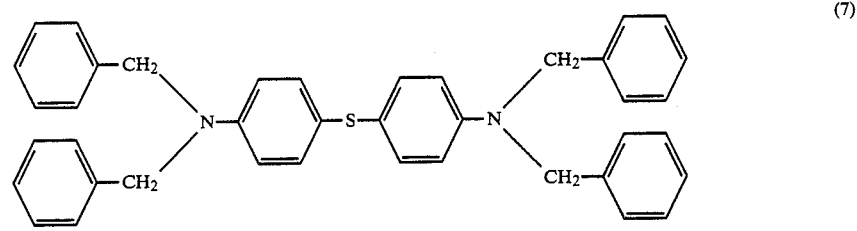
(7)
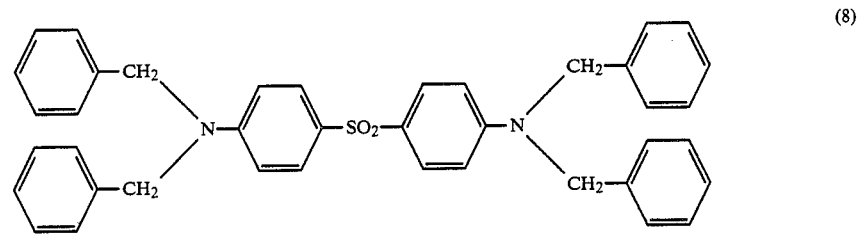
(8)
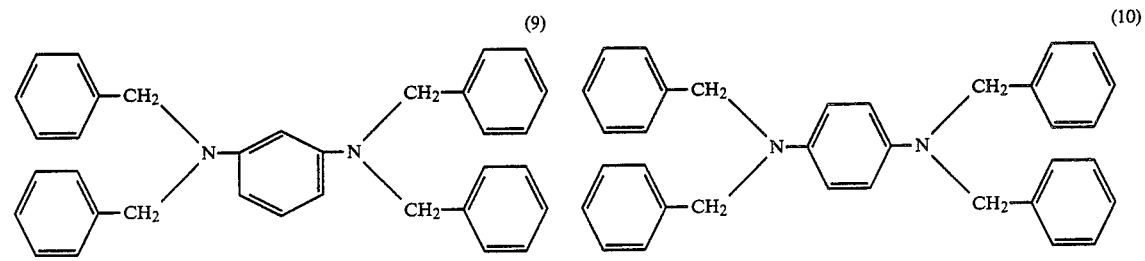
(9) (10)
Triphenylamines:
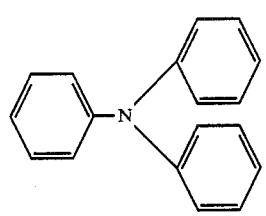
(1)
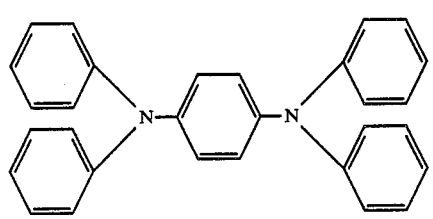
(2)
-continued
Triphenylamines:
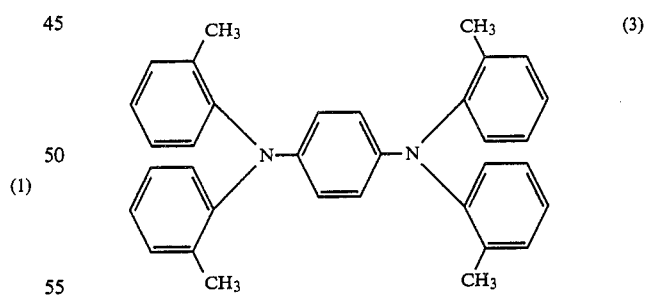
(3)
Diphenylbenzylamines:
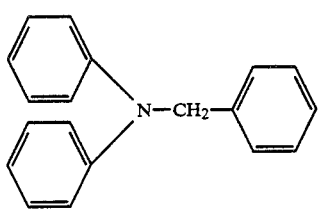
(1)

-continued
Diphenylbenzylamines:
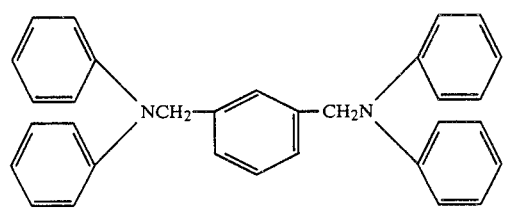
(2)
Triarylalkanes:
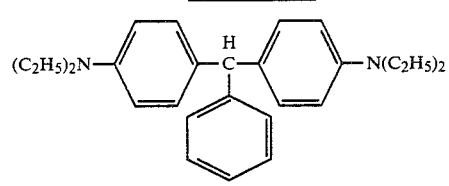
(1)
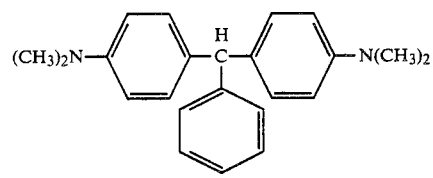
(2)
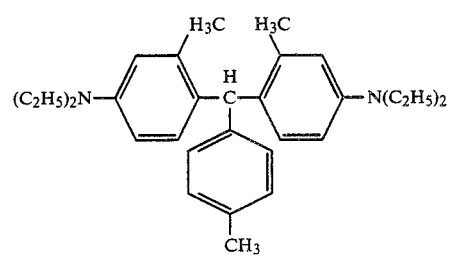
(3)
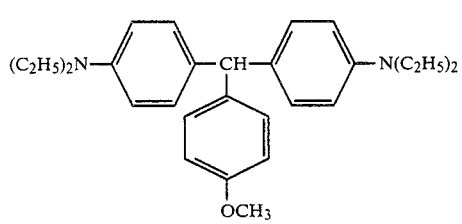
(4)
-continued
Triarylalkanes:
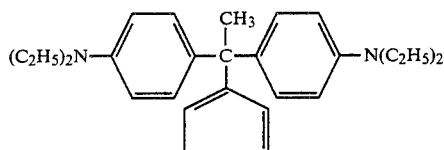
(5)
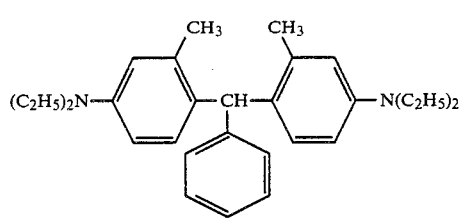
(6)
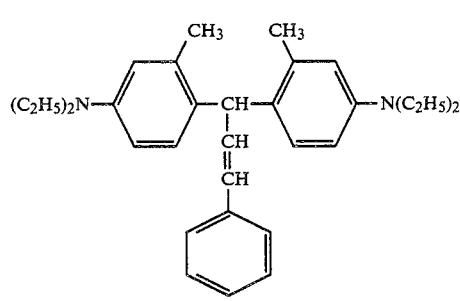
(7)
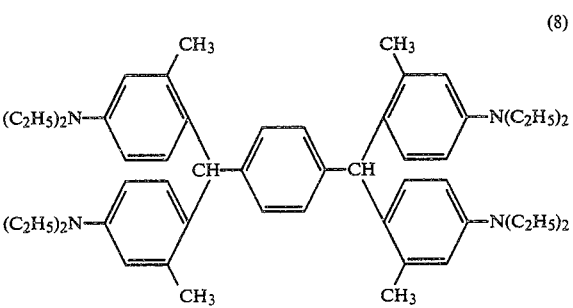
(8)
Oxadiazoles:
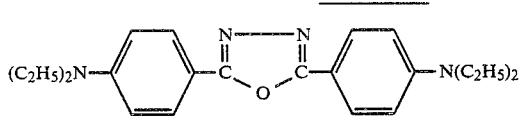
(1)
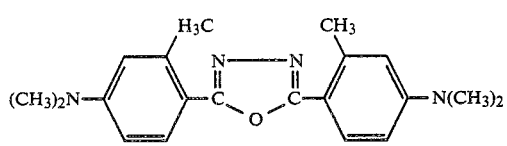
(2)
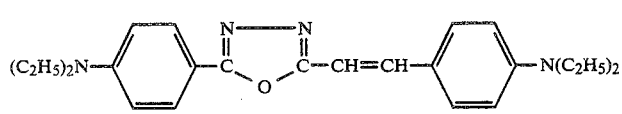
(3)

Oxadiazoles:
(4)
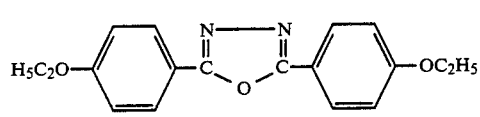
(5)
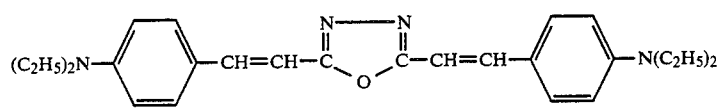
(6)
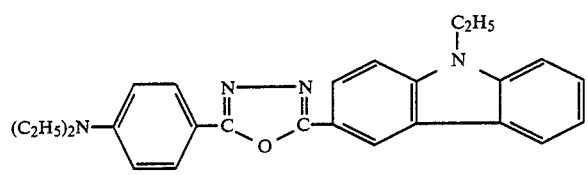
(7)
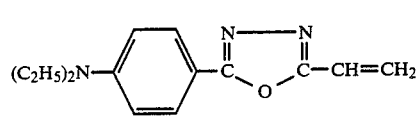
Anthracenes:
(1)
(2)
(3)
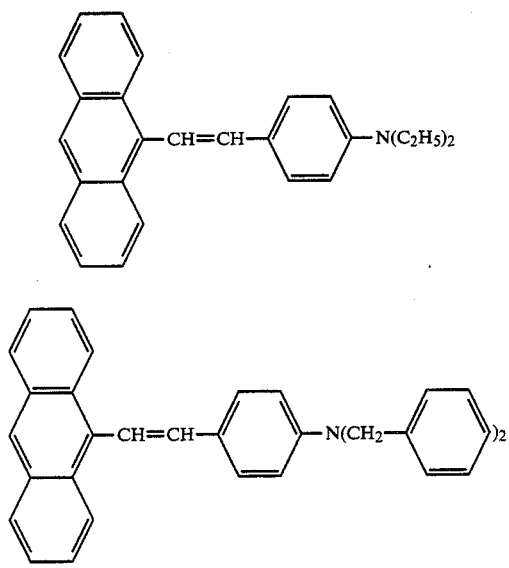
(Thio)oxazoles:
(1)
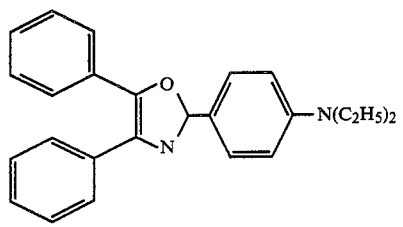
(2)
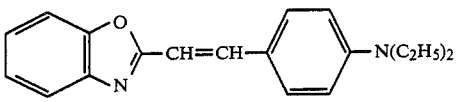
(3)
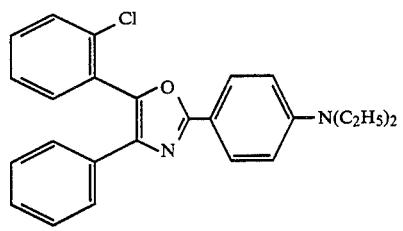
(4)
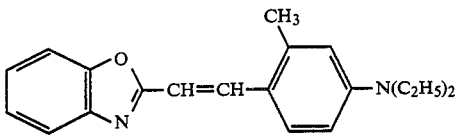
(5)
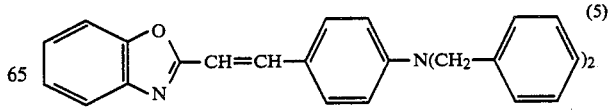

-continued
(Thio)oxazoles:

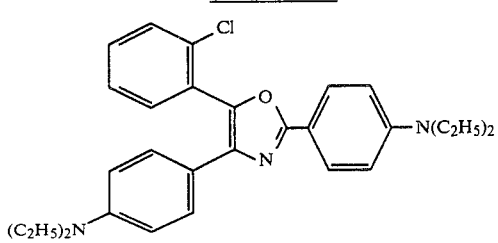

(6)

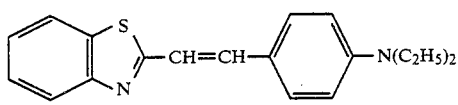

(7)

There may be further mentioned plastic films, plastic drums, and paper sheets made conductive by coating, together with a suitable binder, with conductive polymeric compounds such as poly-N-vinylcarbazole, halogenated poly-N-vinylcarbazole, polyvinylpyrene, polyvinylanthracene, polyvinylacridine, polyglycidylcarbazocopper, and polymer electrolytes; and conductive plastic sheets and drums containing conductive substances such as powdered metals, carbon black, and carbon fibers.

An electrophotographic photoconductive material having the aforementioned photosensitive layer of type 2 is prepared by incorporating a binder into a coating composition for forming the photosensitive layer of type 1. The medium of said coating composition is preferably a substance capable of dissolving the binder. As binders, there may be mentioned polymers and copolymers of vinyl compounds such as styrene, vinyl acetate, acrylate esters, and methacrylate esters; and other polymers such as phenoxy resins, polysulfones, arylate resins, polycarbonates, polyesters, cellulose esters, cellulose ethers, urethane resins, epoxy resins, and acrylpolyol resins. The amount used of a binder is generally in the range of 0.1 to 5 parts by weight for 1 part by weight of the azo pigment. In making such a type of photosensitive layer, it is desirable to disperse in the binder a trisazo pigment of a particle size finer than 3 μm for example, especially 1 μm or below.

Likewise, a photoconductive material having a photosensitive layer of type 3 is prepared by dissolving a charge transfer medium in the coating composition used in forming the photosensitive layer of type 1. For this purpose any of the abovementioned charge transfer media can be used. The charge transfer medium is used preferably together with a binder, except for polyvinylcarbazole and polyglycidylcarbazole which serve also as binders. Any of the binders mentioned above can be used. The binder is used in an amount of 0.1 to 5 parts by weight for 1 part by weight of the azo pigment. The charge transfer medium is used generally in an amount of 0.2 to 1.5, preferably 0.3 to 1.2, parts by weight for 1 part by weight of the binder. A charge transfer medium which serves also as binder is used in an amount of 2 to 10 parts by weight for 1 part by weight of the azo pigment. In this photosensitive layer of type 3, it is desirable, as in the photosensitive layer of type 2, to diperse a finely powdered trisazo pigment in both the charge transfer medium and the binder.

The photosensitive layer of type 4 is formed by overcoating the photosensitive layer of type 1, 2, or 3 with a coating composition comprising a charge transfer medium dissolved in a suitable medium, and drying the coating to form a charge transfer layer. In this case the photosensitive layer of type 1, 2, or 3 serves as charge generating layer. The charge transfer layer is not necessarily provided on the charge generating layer, but can be provided between the charge generating layer and the conductive substrate. However, in view of the durability the former structure is preferred. The charge transfer layer is formed in a manner similar to that of forming the photosensitive layer of type 3, provided the coating composition contains no azo pigment.

The thickness of the charge generating layer is normally 5 to 50 μm.

The photosensitive layer of the photoconductive material of this invention can contain known sensitizers. Suitable sensitizers include Lewis acids and dyes capable of forming a charge transfer complexes with organic photoconductive substances.

As examples of Lewis acids, mention may be made of quinones such as chloranil, 2,3-dichloro-1,4-naphthoquinone, 2-methylanthraquinone, 1-nitroanthraquinone, 1-chloro-5-nitroanthraquinone, 2-chloroanthraquinone, and phenanthrenequinone; aldehydes such as 4-nitrobenzaldehyde; ketones such as 9-benzoylanthracene, indanedione, 3,5-dinitrobenzophenone, and 3,3',5,5'-tetranitrobenzophenone; acid anhydrides such as phthalic anhydride and 4-chloronaphthalic anhydride; cyano compounds such as tetracyanoethylene, terephthalmalononitrile, and 4-nitrobenzalmalononitrile; and other electron attractive compounds such as 3-benzalphthalide, 3-(α-cyano-p-nitrobenzal)phthalide, and 3-(α-cyano-p-nitrobenzal)phthalide.

Examples of suitable dyes include triphenylmethane dyes such as Methyl Violet, Brilliant Green, and Crystal Violet; thiazine dyes such as Methylene Blue; quinone dyes such as Quinizarin; cyanine dyes, pyrylium salts, thiapyrylium salts, and benzopyrylium salts. The photosensitive layer can contain inorganic photoconductive fine particles such as selenium and selenium-assenic alloy and organic photoconductive pigments such as copper-phthalocyanine pigments, and perylene pigments. The photosensitive layer can further contain known plasticizers to improve the film-forming property, flexibility, and mechanical strength. Suitable plasticizers include phthalate esters, phosphate esters, epoxy compounds, chlorinated paraffins, chlorinated fatty acid esters, and aromatic compounds such as methylnaphthalene. The photoconductive material of this invention can, of course, contain, if necessary, an adhesive layer, intermediate layer, or transparent insulating layer.

The photoconductive material containing azo pigments according to this invention is excellent in sensitivity and colorsensitivity; upon repeated use, it shows little change in sensitivity and charge accepting property, little fatigue, and excellent durability. The present photoconductive material can be used not only in electrophotographic copying but also widely in other electrophotographic fields such as a printer using laser, Braun tube (CRT), or light-emitting diode (LED) as light source.

The invention is illustrated below in detail with reference to Examples, but the invention is not limited thereto unless it departs from the essential features of the invention.

EXAMPLE 1

A conductive substrate of polyester film clad with aluminum foil (Alpet 85 of Daido Kako Co.; 10μ in thickness of aluminum foil) was provided with an intermediate layer, 0.05μ in thickness, of a vinyl chloride-vinyl acetate-maleic anhydride copolymer ESUREK MF-10 of Sekisui Chemical Co. A carrier generating layer, 0.5μ in dry thickness, was formed by coating said intermediate layer with an azo pigment dispersion prepared by adding 2 g of aforementioned Compound No. I-2 and 2 g of polyarylate resin (U-100 of Unitika Ltd.) to 100 ml of 1,2-dichloroethane and dispersing in a paint conditioner for about one hour, then drying the coating. A carrier transfer layer, 12μ in dry thickness, was formed by overcoating the carrier generating layer with a solution comprising 5 g of N,N-dibenzylaminobenzaldehyde 1,1-diphenylhydrazone, a carrier transfer substance, and 7 g of polyarylate resin dissolved in 50 ml of 1,2-dichloroethane, and drying the coating to obtain the electrophotographic photoconductive material of this invention.

After having been left standing in the dark place at 30° C. for 1 week, the photoconductive material thus obtained was mounted on an electrostatic paper testing apparatus (Type SP-428 of Kawaguchi Denki Seisakusho Co.) and tested for the characteristics in the following manner.

The photosensitive layer was electrostatically charged by subjecting it for 5 seconds to the corona discharge formed by applying a potential of −6 kV from a charger and the surface potential $V_o$ (−V) was measured. The charged surface was then exposed to a halogen lamp, the illuminance on the surface being 30 lux, and the exposure, $E\frac{1}{2}$ (lux·sec), necessary to decay the surface potential to one-half was determined. After having received an exposure of 30 lux·sec., the photosensitive layer was tested for the surface potential, that is, residual potential $E_{50}$ (−V). Similar test cycle was repeated 500 times. In each cycle, complete removal of the residual potential was performed by exposing to a tungsten lamp for 0.3 second at an illuminance of 300 lux. The results obtained were as shown in Table 1.

TABLE 1

|  | 1st. cycle | 500th cycle |
|---|---|---|
| $V_0$ (−V) | 870 | 840 |
| $E\frac{1}{2}$ (lux · sec.) | 2.7 | 2.6 |
| $E_{50}$ (−V) | about 8 | 0 |

EXAMPLES 2 TO 9

Eight photoconductive materials of this invention were prepared in the same manner as in Example 1, except that Compound Nos. I-1, I-5, I-7, I-14, I-21, I-39, I-44, and I-50 were used. Each photoconductive material was tested for the characteristics as in Example 1. The results obtained were as shown in Table 2.

TABLE 2

| Example No. | Compound No. | First cycle | | | 500th cycle | | |
|---|---|---|---|---|---|---|---|
| | | $V_0$ (−V) | $E\frac{1}{2}$ (lux · sec.) | $E_{50}$ (−V) | $V_0$ (−V) | $E\frac{1}{2}$ (lux · sec.) | $E_{50}$ (−V) |
| 2 | I-1 | 920 | 3.1 | 12 | 910 | 3.1 | 4 |
| 3 | I-5 | 810 | 2.4 | 6 | 790 | 2.4 | 0 |
| 4 | I-7 | 880 | 3.2 | 16 | 860 | 3.1 | 5 |
| 5 | I-14 | 900 | 3.4 | 18 | 870 | 3.3 | 7 |
| 6 | I-21 | 920 | 2.5 | 7 | 880 | 2.5 | 0 |
| 7 | I-39 | 770 | 2.4 | 6 | 710 | 2.4 | 0 |
| 8 | I-44 | 840 | 2.2 | 4 | 810 | 2.1 | 0 |
| 9 | I-50 | 870 | 2.6 | 8 | 850 | 2.5 | 0 |

EXAMPLE 10

An aluminum drum, 3 mm in wall thickness and 80 mm in diameter, was provided on the exterior surface with a subbing layer, 0.08μ in thickness, comprising a vinyl chloride-vinyl acetate (87:13) copolymer. A carrier generating layer, 0.3μ in dry thickness, was formed by coating said subbing layer with an azo pigment dispersion prepared by adding 4 g of Compound No. I-79, an azo pigment, to 400 ml of 1,2-dichloroethane and dispersing in a paint conditioner for about 3 hours, and drying the coating. A carrier transfer layer, 12μ in dry thickness, was formed by overcoating said carrier generating layer with a solution prepared by dissolving 10 g of N,N-diethyl aminobenzaldehyde 1-methyl-1-(2-pyridyl)hydrazone, a carrier transfer substance of the structural formula

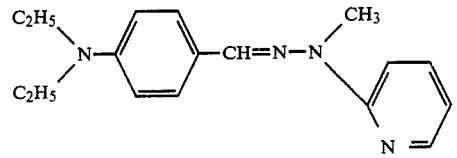

and 12 g of a polycarbonate resin (Panlite L-1250 of Teijin Ltd.) in 100 ml of 1,2-dichloroethane, and drying the coating.

The drum-type photoconductive material thus obtained was mounted on a commerical electrophotographic copier of the cartridge type, which had been partially modified, and reproduction was carried out to obtain a reproduced image which was high in contrast and sharpness and was faithful to the original. One hundred copies were obtained with the result such that the reproduced image remained throughout the same in quality.

EXAMPLE 11

Figure 2:
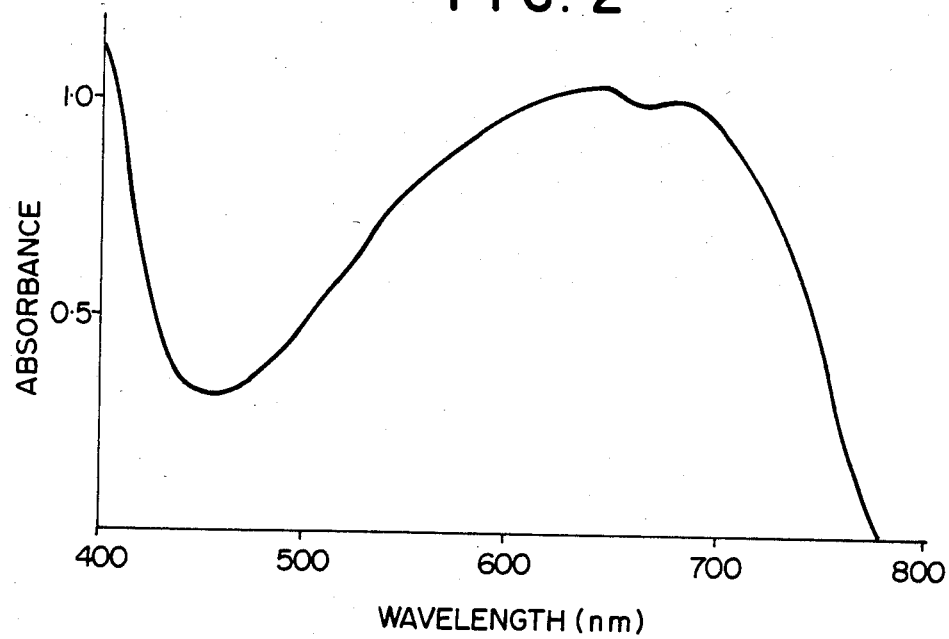
FIG. 2 is the reflection absorption curve of the photoconductive material of this invention in Example 11.

The drum-type photoconductive material obtained in Example 10 was examined for the reflection spectrum by means of an integrating sphere spectrophotometer (UV-365 of Shimadzu Seisakusho Ltd.). The graph representing the results of measurement was as shown in FIG. 2. From the graph it was found that the absorption maxima in the visible region were at around 630 and 670 nm. The spectral sensitivities at 630 and 670 nm were measured by using a monochromator. The energy required for the half decay of potential was found to be as high as about 4.0 erg/cm$^2$ for both wavelengths, indicating that the present photoconductive material is able to endure the actual use under exposure to a light source such as light-emitting diode (LED) or gas-laser beam.

EXAMPLES 12 TO 16

A conductive substrate comprising polyester film and aluminum coating spattered thereon was provided with 0.05μ thick intermediate layer of a vinyl chloride-vinyl acetate copolymer (KANEVILAK L-CP of Kanegafuchi Chemical Co.). A carrier generating layer, 0.1μ in thickness, as formed by coating said intermediate layer with a solution of Compound No. I-3, I-15, I-29, I-48, or I-67 in n-butylamine. A carrier transfer layer, 14μ in dry thickness, was formed by overcoating said carrier generating layer with a solution of 5 g of 1-diethylaminophenyl-3-phenyl-5-styrylpyrazoline and 5 g of a polyester resin (Pylon-200 of Toyobo Co.) in 40 ml of 1,2-dichloroethane, and drying the coating.

Five photoconductive materials thus prepared were each examined for the reflectance absorption curve. From the curve, maximum absorption wavelength in visible and near infra red region, and the energy required for the half-decay of potential at the maximum absorption wavelength were determined as in Example 11. The results obtained were as shown in Table 3. The initial potential $V_0$ exceeded 500 (−V) for each photoconductive material.

TABLE 3

| Example No. | Compound No. | Maximum absorption wavelength (nm) | Energy for half decay (erg/cm$^2$) |
|---|---|---|---|
| 12 | I-3 | 630 | 4.2 |
| 13 | I-15 | 640 | 4.5 |
| 14 | I-29 | 620 | 3.7 |
| 15 | I-48 | 640 | 3.4 |
| 16 | I-67 | 670 | 4.0 |

EXAMPLE 17

A styrene-methyl methacrylate (85:15 by weight) copolymer, Compound No. I-94, and N,N-diethylaminobenzaldehyde N-phenyl-N-(p-methylphenyl)-hydrazone were mixed in a proportion of 1.5:0.2:1. A coating composition was prepared from said mixture and monochlorobenzene (the copolymer and the hydrazone compound were dissolved while the azo pigment was suspended in monochlorobenzene). A single layer-type photoconductive material was prepared by coating an anodized aluminum plate, which had been grained, with the above coating composition to a dry thickness of 6μ and drying. The photoconductive material was tested for the electrophotographic characteristics by means of the aforementioned electrostatic paper testing apparatus to obtain the following results:

Applied potential: +6 kV
$V_0 = 530$ (+V)
$E_{\frac{1}{2}} = 4.2$ (lux·sec.)

EXAMPLES 18 TO 22

Five photoconductive materials were prepared in the same manner as in Example 17, except that Compound No. I-1, I-2, I-7, I-14, or I-54 was used as carrier generating substance. The photoconductive materials were tested for their characteristics. The results obtained were as shown in Table 4.

TABLE 4

| Example No. | Compound No. | $V_0$ (+V) | $E_{\frac{1}{2}}$ (lux · sec.) |
|---|---|---|---|
| 18 | I-1 | 530 | 3.8 |
| 19 | I-2 | 550 | 4.0 |
| 20 | I-7 | 500 | 4.5 |
| 21 | I-14 | 570 | 4.0 |
| 22 | I-54 | 540 | 3.4 |

EXAMPLE 23

A styrene-methyl methacrylate-methacrylic acid copolymer (styrene:methyl methacrylate=2:1 by weight, acid value, 185), Compound No. I-99 (an azo compound), and N,N-diarylaminophenyl N,N-diphenylhydrazone were mixed in a proportion of 2.0:0.5.1.0 by weight. A coating composition was prepared from said mixture and dioxane (the copolymer and the trinitrofluorenone were dissolved while the azo compound was suspended in the dioxane). A single layer-type photoconductive material was prepared by coating an anodized aluminum plate, which had been grained, with the above coating composition to a dry thickness of 6μ and drying. The photoconductive material was tested for the electrophotographic characteristics by means of the aforementioned electrostatic paper testing apparatus to obtain the following results:

Applied potential: +6 kV
$V_0 = 420$ (+V)
$E_{\frac{1}{2}} = 6.5$ (lux·sec.)

An electrostatic charge pattern on the photoconductive material was developed with a toner into a visible image. A lithographic printing plate was prepared by treating the developed photoconductive material with an alkaline processing solution (e.g. a solution containing 3% of triethanolamine, 10% of ammonium carbonate, and 20% of polyethylene glycol having an average molecular weight of 190 to 210) to dissolve the photosensitive layer in non-image areas, and washing with an aqueous sodium silicate solution. The printing plate thus obtained was mounted on an offset press and the printing was carried out to obtain about 100,000 acceptable copies.

The optimum amount of exposure to obtain the electrostatic toner image was 50 lux·sec. (light source: a halogen lamp). The printing plate was directly made without using a block copy.

EXAMPLE 24

A photoconductive substrate of polyester film clad with aluminum foil (Alpet 85 of Daido Kako Co.; 10μ in thickness of aluminum foil) was provided with an intermediate layer, 0.05μ in thickness, of a vinyl chloride-vinyl acetate-maleic anhydride copolymer (ESUREK MF-10 of Sekisui Chemical Co.). A carrier generating layer, 0.5μ in dry thickness, was formed by coating said intermediate layer with an azo compound dispersion prepared by adding 2 g of Compound No. II-1 and 2 g of a polyarylate resin (U-100 of Unitika Ltd.) to 100 ml of 1,2-dichloroethane and dispersing in a paint conditioner for about one hour, then drying the coating. A carrier transfer layer, 12μ in dry thickness, was formed by overcoating said carrier generating layer with a solution comprising 5 g of a carrier transfer substance N,N-dibenzylaminobenzaldehyde 1,1-diphenylhydrazone and 7 g of a polyarylate resin dissolved in 50 ml of 1,2-dichloroethane, and drying the coating.

After having been left standing in the dark place at 30° C. for 1 week, the photoconductive material thus obtained was mounted on an electrostatic paper testing apparatus (Type SP-428 of Kawaguchi Denki Seisakusho Co.) and tested for the electrophotographic characteristics in the following manner.

The photosensitive layer was electrostatically charged by subjecting it for 5 seconds to the corona discharge formed by applying a potential of −6 kV from a charger and the surface potential $V_0$ (−V) was measured. The charged surface was then exposed to a halogen lamp, the illuminance on the surface being 30 lux, and the exposure, $E\frac{1}{2}$ (lux·sec.), necessary to decay the surface potential to one-half was determined. After having received an exposure of 30 lux·sec., the photosensitive layer was tested for the surface potential, that is, residual potential $E_{50}$ (−V). Similar cycle of test was repeated 500 times. In each cycle, complete removal of the residual potential was effected by exposing to a tungsten lamp for 0.3 second at an illuminance of 300 lux. The results obtained were as shown in Table 5.

TABLE 5

|  | 1st cycle | 500th cycle |
| --- | --- | --- |
| $V_0$ (−V) | 870 | 840 |
| $E\frac{1}{2}$ (lux · sec.) | 2.4 | 2.3 |
| $E_{50}$ (−V) | about 5 | 0 |

EXAMPLE 25

Upon examination of the photoconductive material prepared in Example 24 for the reflection spectrum by means of a spectrophotometer (UV-365 of Shimadzu Seisakusho Ltd.), it was found that there are absorption maxima at 670 and 630 nm. The spectral sensitivities at these wavelengths were measured by using a monochromator and the energy required for the half decay of potential was found to be 2.7 erg/cm$^2$ (670 nm) and 2.9 erg/cm$^2$ (630 nm), indicative of high sensitives. It was found that the present photoconductive material is capable of enduring the actual use under continual exposure to a light source such as light-emitting diode (LED) or gas laser beam.

EXAMPLES 26 TO 30

Five photoconductive materials of this invention were prepared in the same manner as in Example 24, except that Compound Nos. II-5, II-10, II-13, II-53, and II-69 were used. Each photoconductive material was tested for the characteristics as in Example 24. The results obtained were as shown in Table 6.

TABLE 6

| Example No. | Compound No. | First cycle | | | 500th cycle | | |
| --- | --- | --- | --- | --- | --- | --- | --- |
| | | $V_0$ (−V) | $E\frac{1}{2}$ (lux · sec.) | $E_{50}$ (−V) | $V_0$ (−V) | $E\frac{1}{2}$ (lux · sec.) | $E_{50}$ (−V) |
| 26 | II-5 | 860 | 2.1 | about 3 | 840 | 2.0 | 0 |
| 27 | II-10 | 810 | 2.4 | about 5 | 790 | 2.2 | 0 |
| 28 | II-13 | 890 | 2.6 | " | 870 | 2.5 | 0 |
| 29 | II-53 | 840 | 2.3 | about 3 | 820 | 2.2 | 0 |
| 30 | II-69 | 810 | 2.0 | " | 780 | 1.9 | 0 |

EXAMPLE 31

An aluminum drum, 60 mm in diameter, was provided on the exterior surface with an intermediate layer, 0.04μ in dry thickness, comprising a vinyl chloride-vinyl acetate (87:13) copolymer (VYHH of UCIC Co.). A carrier generating layer, 0.5μ in dry thickness, was formed by coating said intermediate layer with a dispersion prepared by adding 1 g of Compound No. II-36 to 100 ml of 1,2-dichloroethane and dispersing in a paint conditioner for about 3 hours, and drying the coating. A carrier transfer layer, 15μ in dry thickness, was formed by overcoating said carrier generating layer with a solution prepared by dissolving 10 g of a carrier transfer substance N,N-diallylaminobenzaldehyde 1-phenyl-1-methylhydrazone of the formula

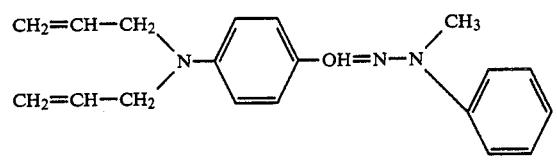

and 12 g of a polycarbonate resin (Panlite L-1250 of Teijin Ltd.) in 100 ml of 1,2-dichloroethane, and drying the coating.

The drum-type photoconductive material of this invention thus obtained was mounted on a commercial electrophotographic copier of the cartridge type, which had been partially modified, and reproduction was carried out to obtain a reproduced image which was high in contrast and sharpness and was faithful to the original. One thousand acceptable copies of the same quality as that of the first copy were obtained.

EXAMPLE 32

Figure 4:
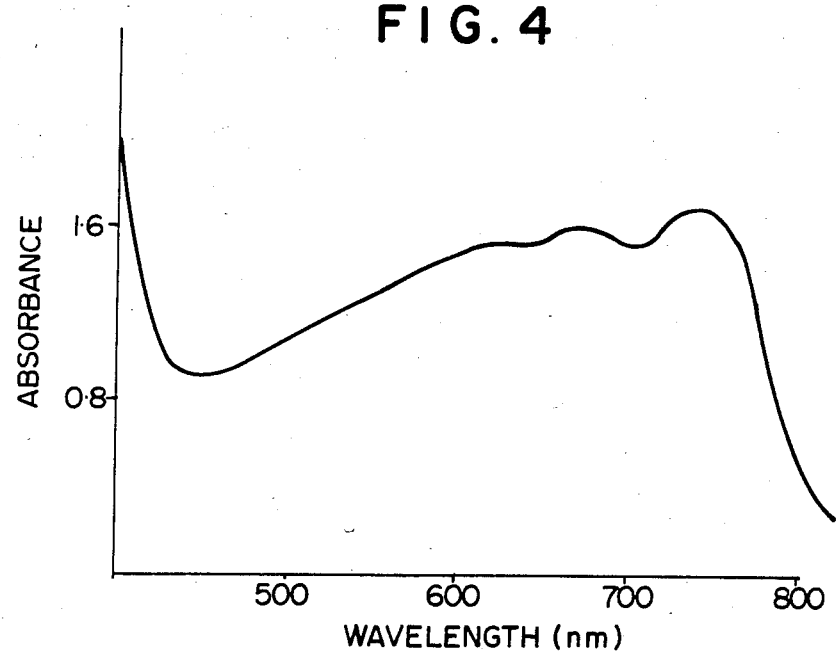
FIG. 4 is the reflection absorption curve of the photoconductive material of this invention in Example 32.

The drum-type photoconductive material obtained in Example 31 was examined for the reflection spectrum by means of an integrating sphere spectrophotometer (UV-365 of Shimadzu Seisakusho Ltd.). The graph representing the results of measurement was as shown in FIG. 4. From the graph it was found that the absorption maxima in the visible region were at around 630, 680, and 750 nm and that the absorption curve was nearly flat between 500 nm and 770 nm. The spectral sensitivity between 600 and 780 nm was from 4.0 to 2.5 erg/cm$^2$, indicating that the photoconductive material of this invention is capable of enduring the use under exposure to light sources such as light-emitting diode (LED), gas laser beam, and semiconductor laser beam.

EXAMPLES 33 TO 39

A substrate comprising a polyester film, 100μ in thickness, and an aluminum coating spattered thereon was coated with a coating composition prepared by adding 5 g of a polyester resin (PE-200 of GE Co.), 4 g of a hydrazone compound of the formula

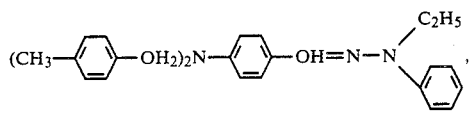

4 g of one of 7 Compounds shown in Table 7, and 100 g of ceramic beads, 1 mm in diameter, to 50 ml of monochlorobenzene and treating the resulting mixture in a paint conditioner (Red Label Co.) for 2 hours to dissolve or suspend the components in the monochlorobenzene, thereby to produce a photoconductive material having a photosensitive layer of about 10μ in thickness.

Seven photoconductive material thus obtained were each tested for the characteristics as in Example 24, except that the applied potential was +6 kV. The results obtained were as shown in Table 7.

TABLE 7

| Example No. | Compound No. | First cycle $V_0$ (+V) | First cycle $E_{\frac{1}{2}}$ (lux·sec.) | First cycle $E_{50}$ (+V) | 500th cycle $V_0$ (+V) | 500th cycle $E_{\frac{1}{2}}$ (lux·sec.) | 500th cycle $E_{50}$ (+V) |
|---|---|---|---|---|---|---|---|
| 33 | II-6  | 740 | 3.0 | 12 | 740 | 3.0 | 10 |
| 34 | II-12 | 790 | 3.5 | 16 | 790 | 3.5 | 13 |
| 35 | II-26 | 830 | 3.2 | 20 | 840 | 3.3 | 25 |
| 36 | II-37 | 850 | 3.6 | 24 | 850 | 3.7 | 28 |
| 37 | II-51 | 810 | 3.3 | 19 | 810 | 3.3 | 17 |
| 38 | II-72 | 770 | 2.5 | 10 | 770 | 2.5 | 10 |
| 39 | II-77 | 790 | 4.2 | 21 | 780 | 4.3 | 26 |

EXAMPLE 40

A photoconductive material having a photosensitive layer of 6μ in thickness was prepared by coating an anodized aluminum sheet, which had been grained, with a coating composition obtained by mixing a styrene-methyl methacrylate-methacrylic acid copolymer (styrene to methyl methacrylate ratio=2:1 by weight, acid value, 185), Compound No. II-72, 1-phenyl-3-p-diethylaminostyryl-5-p-diethylaminophenylpyrazoline in a proportion of 1.5:0.2:1 by weight and treating the mixture in dioxane so as to allow the copolymer and the pyrazoline compound to dissolve and the azo pigment to suspend in the dioxane, and drying the coating. The photoconductive material thus obtained was tested for the electrophotographic characteristics by means of the aforementioned electrostatic paper testing apparatus, and the following results were obtained:

Applied potential: +6 kV
$V_0 = 420$ (+V)
$E_{\frac{1}{2}} = 4.5$ (lux·sec.)

An electrostatic charge pattern on the photoconductive material was developed with a developer (toner) into a visible image. A lithographic printing plate was prepared by treating the developed photoconductive material with an alkaline processing solution (e.g. a solution containing 3% of triethanolamine, 10% of ammonium carbonate, and 20% of polyethylene glycol having an average molecular weight of 190 to 210) to dissolve the photosensitive layer in non-image areas, and washing with an aqueous sodium silicate solution. The printing plate thus obtained was mounted on an offset press and the printing was carried out to obtain about 100,000 acceptable copies.

The optimum amount of exposure to obtain the electrostatic toner image was 30 lux·sec. (light source: a halogen lamp). The printing plate was directly made without using a block copy.

What is claimed is:

1. An electrophotographic photoconductive material comprising an electroconductive substrate and, provided thereon, a photosensitive layer containing a trisazo pigment represented by the general formula

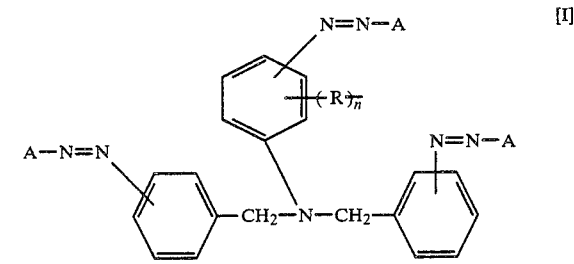

wherein R's, which may be the same or different, are each a hydrogen atom, halogen atom, substituted or unsubstituted alkyl group, alkoxyl group, or nitrile group; n is an integer of 1 or 2; and A is

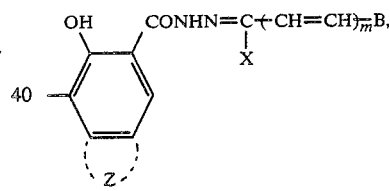

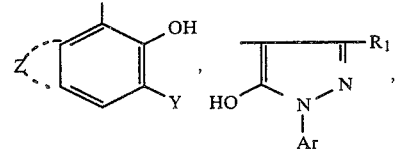

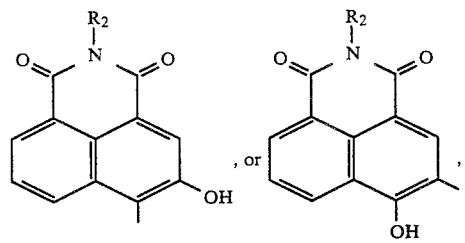

wherein Z is a group of atoms necessary to complete a substituted or unsubstituted aromatic carbon ring or a substituted or unsubstituted aromatic hetero-ring; X is a hydrogen atom, an alkyl group, or a group of atoms necessary to complete a substituted or unsubstituted aromatic carbon ring, a substituted or unsubstituted aromatic hetero ring, or a substituted or unsubstituted hetero ring; m is 0 or 1; B is a group of atoms necessary to complete a substituted or unsubstituted aromatic carbon ring, a substituted or unsubstituted aromatic hetero ring, or a substituted or unsubstituted monocyclic hetero ring; Y is a hydrogen atom, hydroxyl group, carboxyl group or an ester thereof, sulfo group, substituted or unsubstituted carbamoyl group, or substituted or unsubstituted sulfamoyl group; $R_1$ represents a hydrogen atom, substituted or unsubstituted alkyl group, substituted or unsubstituted amino group, substituted or unsubstituted carbamoyl group, carboxyl group or an ester thereof, or cyano group; Ar is a substituted or unsubstituted aryl group; and $R_2$ is a substituted or unsubstituted alkyl group, substituted or unsubstituted aralkyl group, or substituted or unsubstituted aryl group.

2. An electrophotographic photoconductive material according to claim 1, wherein the photosensitive layer contains a carrier transfer substance and a carrier generating substance and said carrier generating substance is a trisazo pigment represented by the general formula [I] described above.

3. An electrophotographic photoconductive material according to claim 1, wherein the trisazo pigment represented by the general formula [I] is a compound represented by the formula

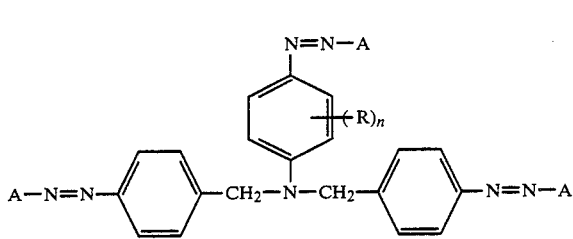

wherein R, n, and A are as defined in claim 1.

* * * * *